(12) United States Patent
Masui

(10) Patent No.: US 9,851,931 B2
(45) Date of Patent: Dec. 26, 2017

(54) INFORMATION PROCESSING APPARATUS, TERMINAL APPARATUS, AND NON-TRANSITORY COMPUTER READABLE MEDIUM

(71) Applicant: FUJI XEROX CO., LTD., Tokyo (JP)

(72) Inventor: Takanori Masui, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/010,685

(22) Filed: Jan. 29, 2016

(65) Prior Publication Data

US 2017/0046105 A1  Feb. 16, 2017

(30) Foreign Application Priority Data

Aug. 11, 2015  (JP) ................................. 2015-158744

(51) Int. Cl.
*G06F 3/12* (2006.01)
*G06F 9/445* (2006.01)
(Continued)

(52) U.S. Cl.
CPC .......... *G06F 3/1225* (2013.01); *G06F 3/1204* (2013.01); *G06F 3/1222* (2013.01);
(Continued)

(58) Field of Classification Search
USPC ........................................................ 358/1.14
See application file for complete search history.

(56) References Cited

U.S. PATENT DOCUMENTS 8,213,028 B2   7/2012 Ikeda et al.
2008/0088867 A1   4/2008 Ikeda et al.
(Continued)

FOREIGN PATENT DOCUMENTS

EP   2 230 599 A1   9/2010
JP   2005-79800 A   3/2005
(Continued)

OTHER PUBLICATIONS

Communication dated Dec. 12, 2016, from the European Patent Office in counterpart European application No. 16157522.0.

*Primary Examiner* — Ngon Nguyen
(74) *Attorney, Agent, or Firm* — Sughrue Mion, PLLC

(57) ABSTRACT

An information processing apparatus includes a memory, a first obtaining unit, a second obtaining unit, and an updating unit. The memory stores setting information that is information for indicating a condition in which a user has utilized a function of the information processing apparatus. The first obtaining unit obtains, from a terminal apparatus, a user identification information for identifying the user, a function identification information for identifying a function utilized by the user, and apparatus identification information for identifying an apparatus that stores latest setting information used when the user has utilized the function most recently. The second obtaining unit obtains, in a case where the apparatus identified by the apparatus identification information is an external apparatus, the latest setting information from the external apparatus. The updating unit updates the setting information stored in the memory to the latest setting information obtained by the second obtaining unit.

17 Claims, 20 Drawing Sheets

| PLUG-IN ID | USER ID | SETTING INFORMATION | | |
|---|---|---|---|---|
| | | COLOR MODE | NUMBER OF PRINTED COPIES (TOTAL) | .. |
| P002 (PLUG-IN β) | U003 (USER C) | BLACK AND WHITE | 50 | .. |
| P002 (PLUG-IN β) | U002 (USER B) | COLOR | 20 | .. |
| P002 (PLUG-IN β) | U002 (USER B) | COLOR | 10 | .. |
| ... | ... | ... | ... | .. |

(51) Int. Cl.
*H04N 1/00* (2006.01)
*H04N 1/32* (2006.01)

(52) U.S. Cl.
CPC .......... *G06F 3/1238* (2013.01); *G06F 3/1292* (2013.01); *G06F 3/1293* (2013.01); *G06F 9/44526* (2013.01); *H04N 1/00204* (2013.01); *H04N 1/00278* (2013.01); *H04N 1/00307* (2013.01); *H04N 1/00421* (2013.01); *H04N 1/00424* (2013.01); *H04N 1/00435* (2013.01); *H04N 1/00477* (2013.01); *H04N 1/00482* (2013.01); *H04N 1/00503* (2013.01); *H04N 1/00514* (2013.01); *H04N 1/00938* (2013.01); *H04N 1/00952* (2013.01); *H04N 1/00973* (2013.01); *H04N 1/32523* (2013.01); *H04N 2201/006* (2013.01); *H04N 2201/0039* (2013.01); *H04N 2201/0041* (2013.01); *H04N 2201/0049* (2013.01); *H04N 2201/0055* (2013.01); *H04N 2201/0091* (2013.01); *H04N 2201/0094* (2013.01); *H04N 2201/0096* (2013.01)

(56) References Cited

U.S. PATENT DOCUMENTS

| | | | |
|---|---|---|---|
| 2009/0168114 A1* | 7/2009 | Nishimura | H04L 51/063 358/402 |
| 2011/0205558 A1 | 8/2011 | Nakajima | |
| 2013/0057899 A1* | 3/2013 | Fukuhara | G06F 3/1222 358/1.14 |
| 2014/0168682 A1 | 6/2014 | Muto | |
| 2014/0300920 A1 | 10/2014 | Hayashi | |
| 2014/0320884 A1* | 10/2014 | Ide | G06K 15/4095 358/1.14 |
| 2015/0124285 A1 | 5/2015 | Iwasaki | |
| 2015/0154482 A1 | 6/2015 | Kawai | |

FOREIGN PATENT DOCUMENTS

| | | |
|---|---|---|
| JP | 2006-196983 A | 7/2006 |
| JP | 2008-97253 A | 4/2008 |

\* cited by examiner

FIG. 7

| USER ID | PLUG-IN ID | APPARATUS ID |
|---|---|---|
| U001 | P001 | E01 |
|  | P002 | E03 |
|  | P003 | E03 |
|  | P004 | E02 |
| ... | ... | ... |

FIG. 8A

| Scan | Back | Close | ☐ Sign-out |

B1 →  C1  C2  C3

Stored in: Fuji Taro's Drawer > Product Concerned > Document Management
File Name: Auto Setting ▽   About purchase of management software.pdf

D1  D2  D11

Output File Format: pdf ▽
Color Mode: Full Color ▽
Original Orientation: Head to Left ▽
Scan Size: A4 Landscape ▽
Scan Resolution: 200 dpi ▽
2-Sided Original Feeding: 2-Sided (Head to Head) ▽

D3  D21

☑ Background Suppression  ☐ Shadow Suppression
☐ High Compression

D31

C4
Start Scan

Number of Addresses: 2    C5 — Start Fax

XX Office Fax
03-xxxx-xxxx                Details

D4

☐ Email to User
D41  xxxxxxxx.co.jp

☑ XX Office Fax
03-xxxx-xxxx

☑ Store on Shared PC
\\xxx\xxx\xxx

☐ XX Corporation
03-xxxx-xxxx

☐ XX Sales Agency
xxxxxxxx.co.jp

☐ File Server
\\xxx\xxx\xxx

FIG. 9A

| PLUG-IN ID | USER ID | SETTING INFORMATION | | |
|---|---|---|---|---|
| | | STORAGE DESTINATION FOLDER NAME | FILE NAME | ·· |
| P001 (PLUG-IN α) | U001 (USER A) | CIRCULAR MEMOS | ABOUT PURCHASE OF MANAGEMENT SOFTWARE | ·· |
| P001 (PLUG-IN α) | U001 (USER A) | CIRCULAR MEMOS | ABOUT SIGNING OF MAINTENANCE CONTRACT | ·· |
| P001 (PLUG-IN α) | U001 (USER A) | COMMUTING EXPENSES | RECEIPT FOR FUJI HOTEL | ·· |
| ... | ... | ... | ... | ·· |

FIG. 9B

| PLUG-IN ID | USER ID | SETTING INFORMATION | | |
|---|---|---|---|---|
| | | COLOR MODE | NUMBER OF PRINTED COPIES (TOTAL) | ·· |
| P002 (PLUG-IN β) | U003 (USER C) | BLACK AND WHITE | 50 | ·· |
| P002 (PLUG-IN β) | U002 (USER B) | COLOR | 20 | ·· |
| P002 (PLUG-IN β) | U002 (USER B) | COLOR | 10 | ·· |
| ... | ... | ... | ... | ·· |

FIG. 10

| PLUG-IN ID |
|---|
| P001 (PLUG-IN α) |
| P002 (PLUG-IN β) |
| P004 (PLUG-IN δ) |

FIG. 11

| PLUG-IN ID |
|---|
| USER ID |
| VERSION OF PLUG-IN |
| SETTING INFORMATION |
| INPUT LOG |
| OPERATION LOG |
| FUNCTION SETTING INFORMATION |
| REGISTERED INFORMATION |

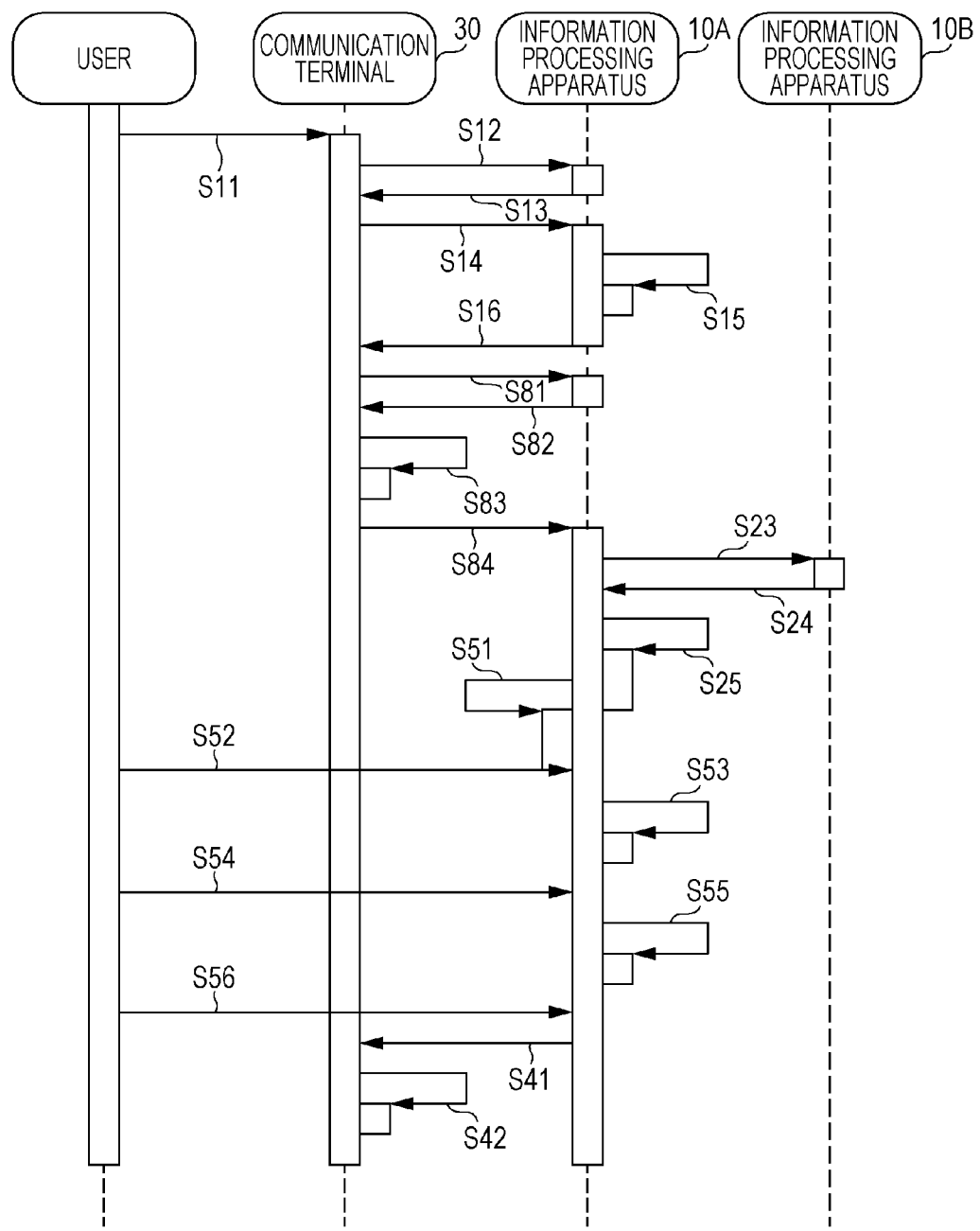

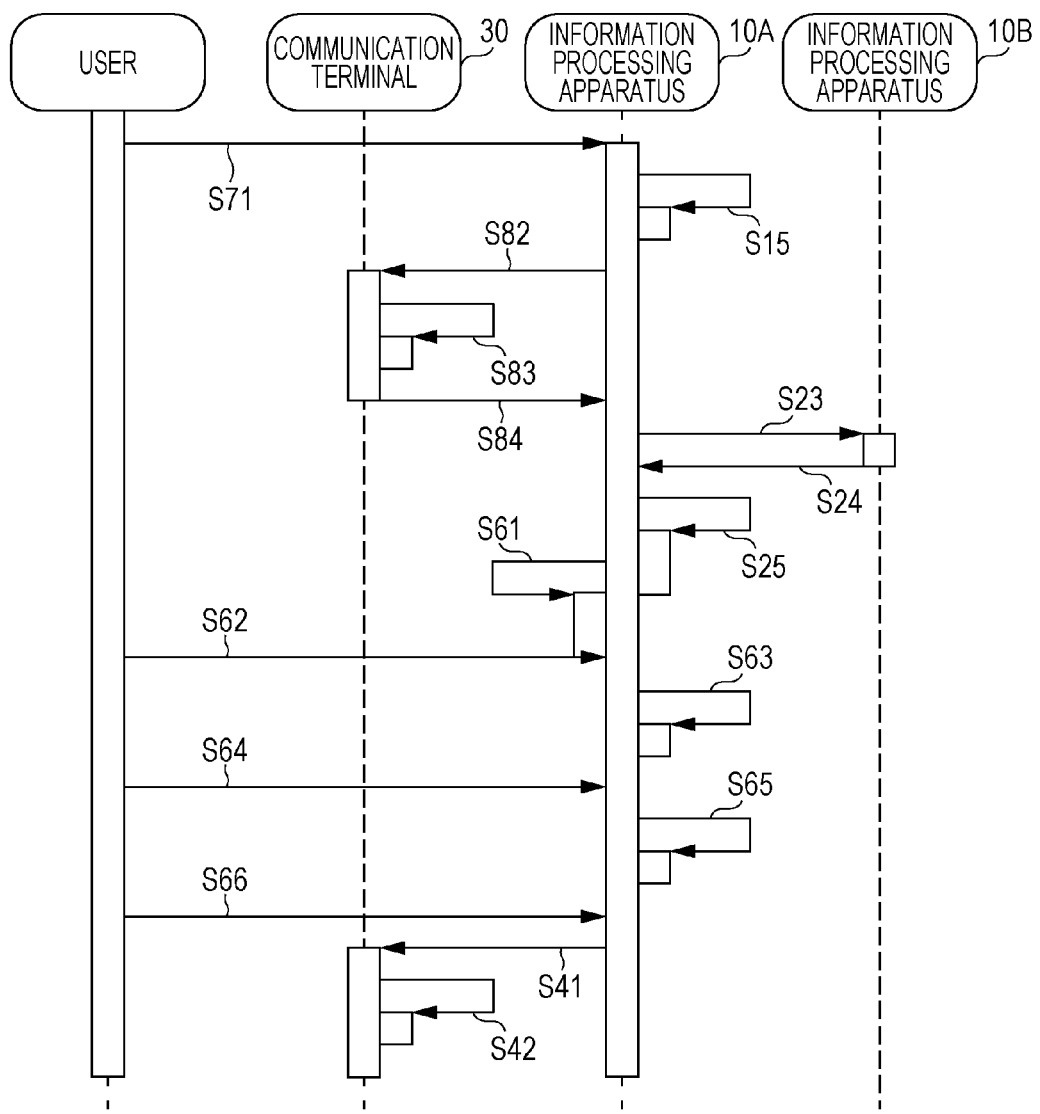

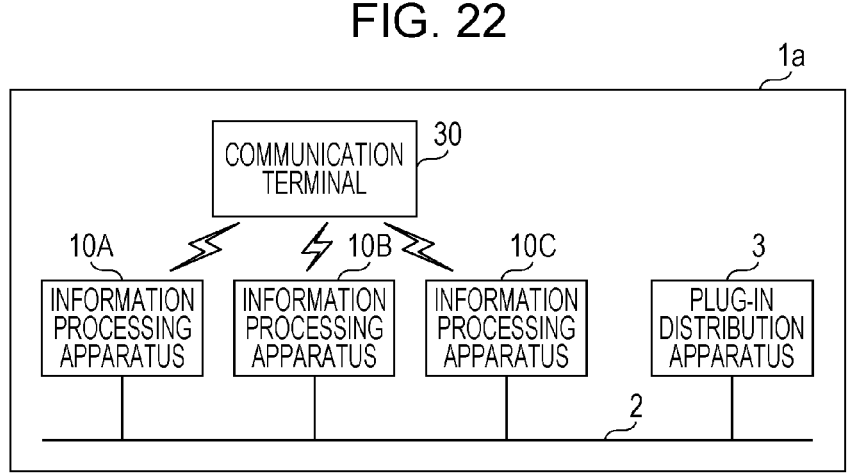

INFORMATION PROCESSING APPARATUS, TERMINAL APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-158744 filed Aug. 11, 2015.

BACKGROUND (i) Technical Field

The present invention relates to an information processing apparatus, a terminal apparatus, and a non-transitory computer readable medium.

(ii) Related Art

A technique is available that allows each user to customize settings when the user utilizes a function of an information processing apparatus, such as a multifunction peripheral. With this technique, in the case where plural information processing apparatuses have a function in common, setting information stored for each user in the individual information processing apparatuses is used. In such a case, omitting a server that manages the setting information is desired because of issues involving maintenance and management of the server.

SUMMARY

According to an aspect of the invention, there is provided an information processing apparatus including a memory, a first obtaining unit, a second obtaining unit, and an updating unit. The memory stores setting information that is information for indicating a condition in which a user has utilized a function of the information processing apparatus. The first obtaining unit obtains, from a terminal apparatus, user identification information for identifying the user, function identification information for identifying a function utilized by the user, and apparatus identification information for identifying an apparatus that stores latest setting information used when the user has utilized the function most recently. The second obtaining unit obtains, in a case where the apparatus identified by the apparatus identification information is an external apparatus, the latest setting information from the external apparatus. The updating unit updates the setting information stored in the memory to the latest setting information obtained by the second obtaining unit.

BRIEF DESCRIPTION OF THE DRAWINGS

An exemplary embodiment of the present invention will be described in detail based on the following figures, wherein:

FIG. 7 illustrates an example of a user identification (ID), a plug-in ID, and an apparatus ID;

FIGS. 8A and 8B illustrate examples of user interface (UI) screens displayed on a UI unit;

FIGS. 9A and 9B illustrate examples of setting information;

FIG. 10 illustrates an example of a plug-in list;

FIG. 11 illustrates an example of setting information data;

FIG. 20 illustrates another example of a procedure of operations performed by the information processing apparatuses and the communication terminal included in the information processing system according to the modification;

FIG. 21 illustrates another example of a procedure of operations performed by the information processing apparatuses and the communication terminal included in the information processing system according to the modification;

FIG. 22 illustrates an overall configuration of an information processing system according to a modification;

FIG. 23 illustrates an example of a UI screen displayed on the UI unit according to a modification;

DETAILED DESCRIPTION

1. Exemplary Embodiment

Figure 1:
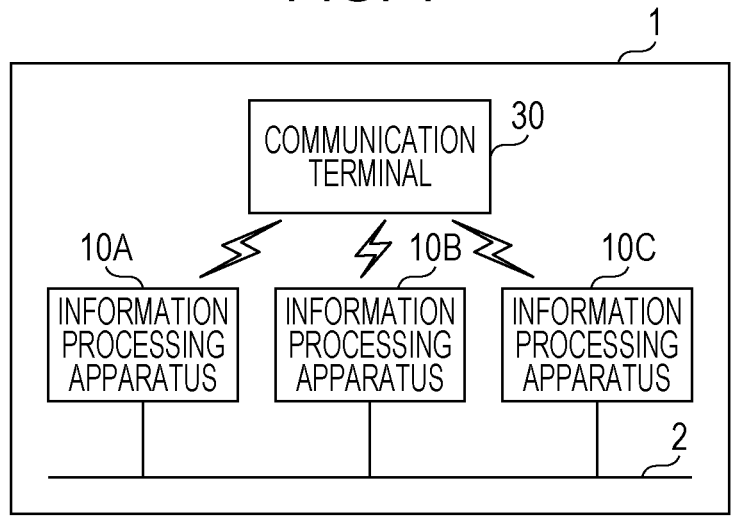
FIG. 1 illustrates an overall configuration of an information processing system.

FIG. 1 illustrates an overall configuration of an information processing system 1 according to an exemplary embodiment of the present invention. The information processing system 1 provides a user with functions not relating to image processing or various functions relating to image processing, such as forming an image on a recording medium, such as paper, and scanning an image from a recording medium. Examples of the functions relating to image processing include a copy function, a facsimile (fax) function, and print function. The information processing system 1 includes a communication network 2, information processing apparatuses 10A, 10B, and 10C (which are referred to as "information processing apparatuses 10" when they are not distinguished from one another), and a communication terminal 30. The communication network 2 is a system that allows apparatuses connected thereto to exchange data with each other. The communication network 2 may be, for example, a local area network (LAN) or a wide area network (WAN).

The information processing apparatus 10, which is an example of an information processing apparatus according to an aspect of the present invention, includes an image forming unit that forms an image on a recording medium and provides a user with the aforementioned various functions. The information processing apparatus 10 stores programs that implement these functions. The functions include pre-installed functions, such as functions implemented by firmware, and functions that are installed later. Examples of such firmware include, a general-purpose operating system (OS) and controllers (programs for controlling corresponding control targets).

Examples of the functions that are installed later include functions implemented by plug-ins or add-ons. For example, functions added by such plug-ins or add-ons include added or extended functions relating to image processing, such as a function of recognizing a specific form, a function for performing optical character recognition (OCR), and a function of transferring data that is obtained by scanning an original by the information processing apparatus 10 to a cloud server. Such functions may be intended to add or extend functions other than the functions relating to image processing. A "plug-in" according to the exemplary embodiment corresponds to a function that is executed by the information processing apparatus.

The information processing apparatus 10 has a short-range wireless communication function, which enables short-range communication via which authentication information is exchanged by using Near Field Communication (NFC)-based peer-to-peer (P2P) communication or is exchanged wirelessly via Bluetooth (registered trademark) or a piconet that is dynamically formed between plural Bluetooth devices when the Bluetooth devices are located close to one another. In the exemplary embodiment, the information processing apparatus 10 performs NFC communication as the short-range wireless communication from among these types. The communication terminal 30, which is an example of a terminal apparatus, may be a smartphone or a tablet terminal that is a user portable device.

The communication terminal 30 has a short-range wireless communication function (NFC communication function in the exemplary embodiment) described above. The communication terminal 30 communicates with each of the information processing apparatuses 10 in accordance with NFC. The communication terminal 30 is connected to the information processing apparatuses 10 via NFC communication and is used as a user interface (UI) for operating the information processing apparatuses 10.

Figure 2:
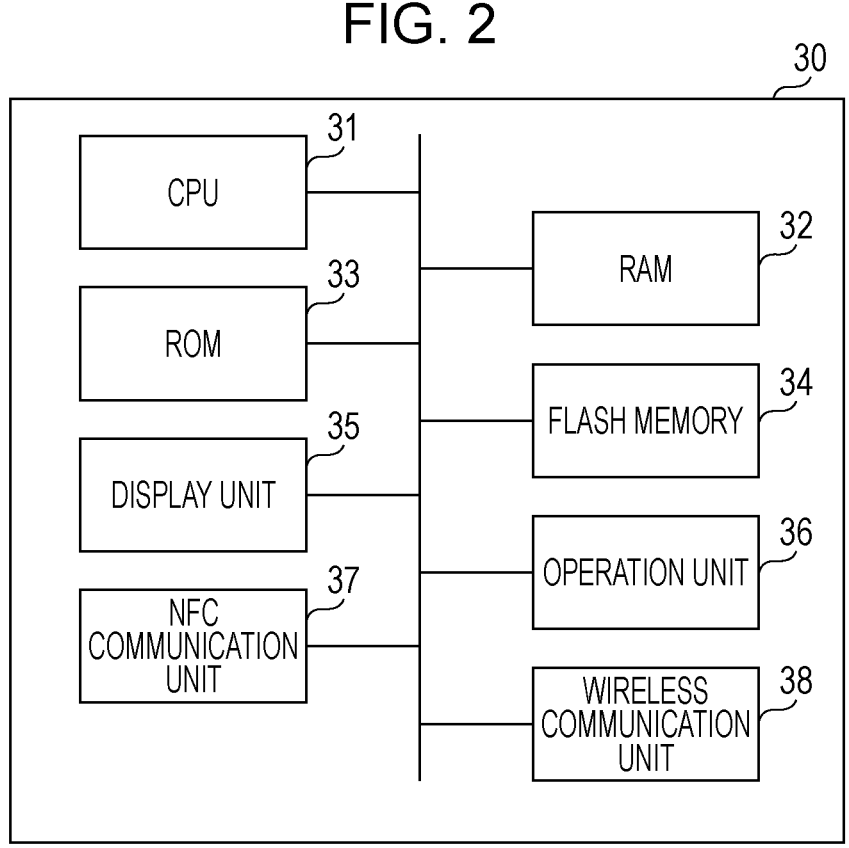
FIG. 2 illustrates a hardware configuration of a communication terminal.

FIG. 2 illustrates a hardware configuration of the communication terminal 30. The communication terminal 30 is a computer including a central processing unit (CPU) 31, a random access memory (RAM) 32, a read-only memory (ROM) 33, a flash memory 34, a display unit 35, an operation unit 36, an NFC communication unit 37, and a wireless communication unit 38. The CPU 31 executes a program stored in the ROM 33 or the flash memory 34 by using the RAM 32 as its workspace to control operations of the individual components of the communication terminal 30.

The flash memory 34 stores various programs and data. The display unit 35 includes a liquid crystal display or a display of another type. The display unit 35 is controlled by the CPU 31 to display various messages and images. The operation unit 36 includes members used for operating the information processing apparatuses 10, the members including a touchscreen disposed on the display. The NFC communication unit 37 includes components, such as a circuit and an antenna that are used to perform NFC communication. The NFC communication unit 37 communicates, for example, with the information processing apparatuses 10 in accordance with NFC. The wireless communication unit 38 includes components, such as a circuit and an antenna that are used to perform wireless communication, such as mobile communication or wireless LAN communication. The wireless communication unit 38 communicates with the information processing apparatus 10 via a mobile communication network or the Internet, for example.

Figure 3:
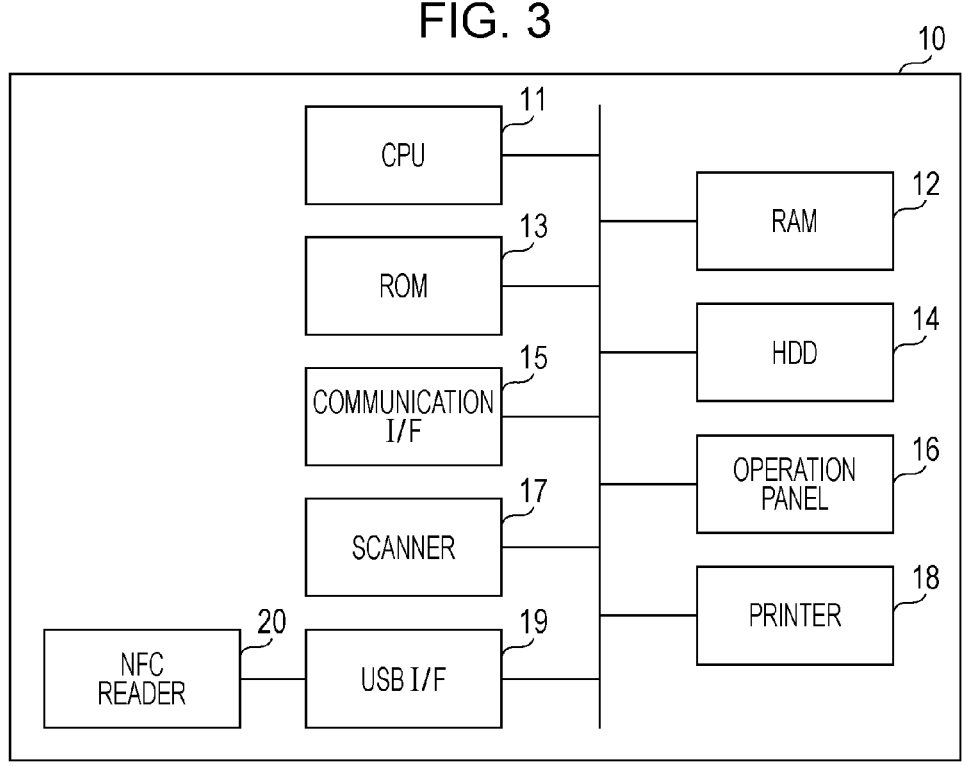
FIG. 3 illustrates a hardware configuration of an information processing apparatus.

FIG. 3 illustrates a hardware configuration of the information processing apparatus 10. The information processing apparatus 10 is a computer including a CPU 11, a RAM 12, a ROM 13, an HDD 14, a communication interface (I/F) 15, an operation panel 16, a scanner 17, a printer 18, a universal serial bus (USB) I/F 19, and an NFC reader 20. The CPU 11, the RAM 12, the ROM 13, and the HDD 14 are hardware components of the same type as the CPU 31, the RAM 32, the ROM 33, and the flash memory 34, respectively. The communication I/F 15 functions as an interface of data communication that is performed via the communication network 2.

The operation panel 16 includes, for example, a display that displays various messages and images and members used for operating the information processing apparatuses 10, the members including a touchscreen disposed on the display. The scanner 17 is a scanning unit that scans an image on a recording medium, such as paper. For example, the scanner 17 optically scans an image on a recording medium. The printer 18 is an image forming unit that forms an image on a recording medium. The printer 18 forms an image on a recording medium in accordance with an electrophotographic system by using toners of four colors, i.e., yellow (Y), magenta (M), cyan (C), and black (K), for example. The USB I/F 19 is an interface for performing communication based on a USB standard. The NFC reader 20 is a communication device that performs NFC communication and is controlled by the CPU 11 via the USB I/F 19. The NFC reader 20 communicates with, for example, the communication terminal 30 in accordance with NFC.

Figure 4:
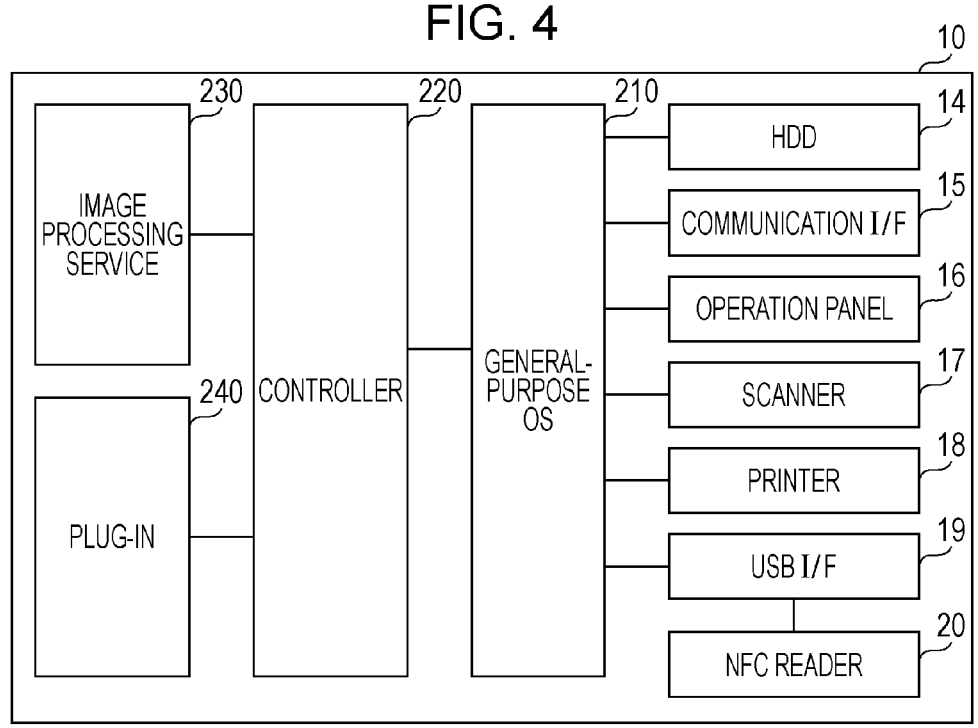
FIG. 4 illustrates an overview of a software configuration of the information processing apparatus.

FIG. 4 illustrates an overview of a software configuration of the information processing apparatus 10. The information processing apparatus 10 includes a general-purpose OS 210, a controller section 220, an image processing service section 230, and a plug-in section 240. The general-purpose OS 210, which is an operating system of the information processing apparatus 10, controls hardware, such as the HDD 14, the communication I/F 15, and the operation panel 16. The controller section 220 controls the image processing service section 230 and the plug-in section 240. The image processing service section 230 provides services involving image processing, such as a scan service and a print service. The plug-in section 240 adds a function to the information processing apparatus 10 or extends a function of the information processing apparatus 10.

Figure 5:
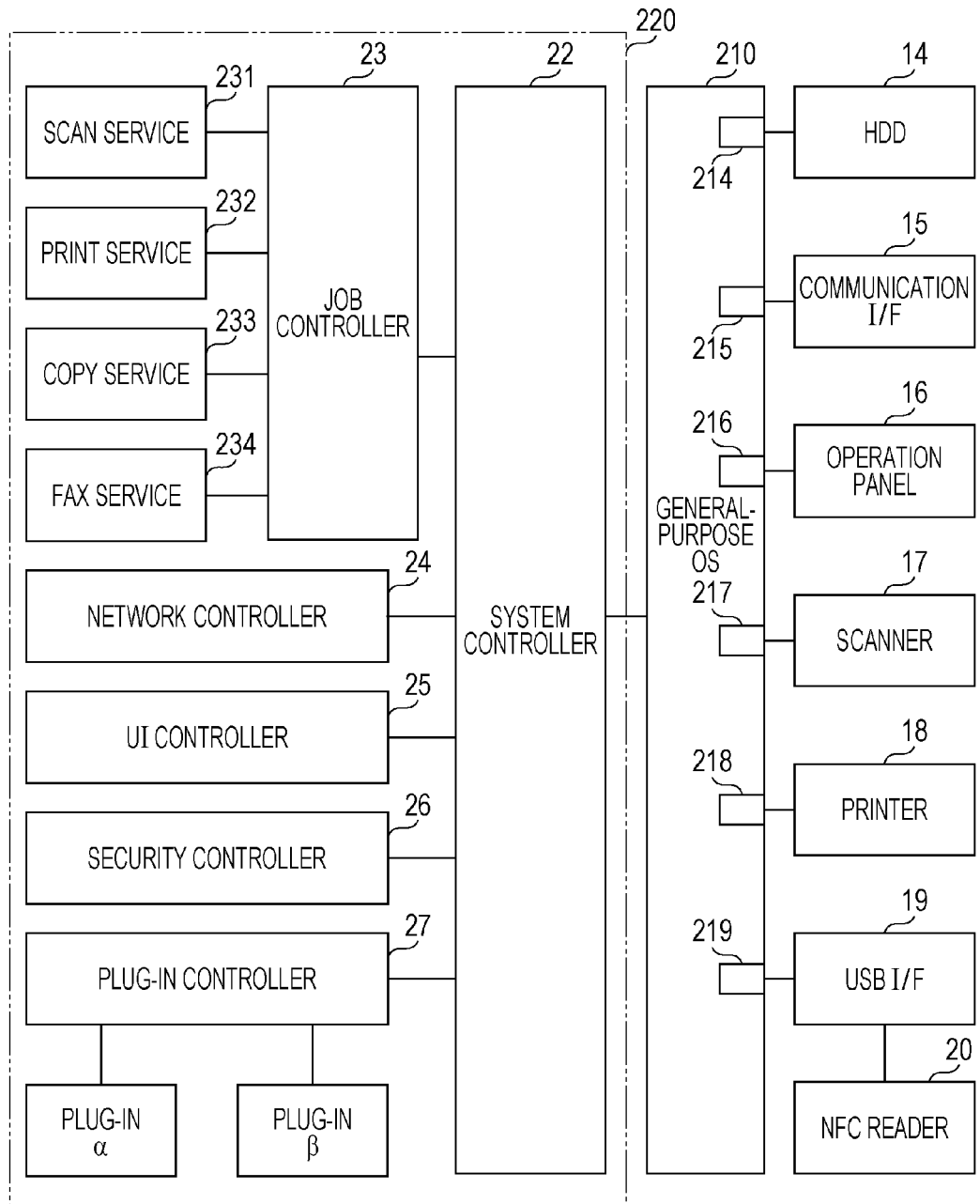
FIG. 5 illustrates details of the software configuration of the information processing apparatus.

FIG. 5 illustrates details of the software configuration of the information processing apparatus 10. The general-purpose OS 210 includes drivers 214, 215, 216, 217, 218, and 219 for the respective hardware components, specifically, for the HDD 14, the communication I/F 15, the operation panel 16, the scanner 17, the printer 18, and the USB I/F 19, respectively. The drivers 214, 215, 216, 217, 218, and 219 connect the respective hardware components to the general-purpose OS 210.

The controller section 220 includes a system controller 22, a job controller 23, a network controller 24, a UI controller 25, a security controller 26, and a plug-in controller 27. The system controller 22 operates on the general-purpose OS 210 and controls various tasks including various controllers, such as the job controller 23, and various services, such as a scan service 231. The job controller 23 controls jobs of the scan service 231, a print service 232, a copy service 233, and a FAX service 234 that are requested via the network controller 24 or the UI controller 25. The network controller 24 controls acceptance of a job request and reception of job data from the communication I/F 15, reception of a plug-in, and transmission and reception of setting information.

The UI controller 25 controls displaying of a UI screen on the operation panel 16 or the communication terminal 30 and acceptance of a user operation including a key input. A UI screen is a screen that contains images representing members operated by the user to operate the information processing apparatus 10 and information provided by the information processing apparatus 10 to the user. The security controller 26 controls a function relating to authentication and communication encryption.

The plug-in controller 27 performs processes, such as adding a plug-in, deleting a plug-in, controlling execution of a plug-in, and controlling setting information. The term "setting information" used herein refers to information for indicating a condition in which a process is performed when a function of the information processing apparatus 10 is carried out. For example, setting information is information for indicating a condition in which a function of a plug-in used by the information processing apparatus 10 is carried out. In the exemplary embodiment, setting information is stored on a per user basis. For example, in the case where the scan service 231 is utilized, information such as a path indicating a storage destination, a file name, and an output file format is stored as setting information. The plug-in controller 27 performs the aforementioned processes for a plug-in for transferring a file obtained by scanning and a plug-in for printing via a cloud server.

Figure 6:
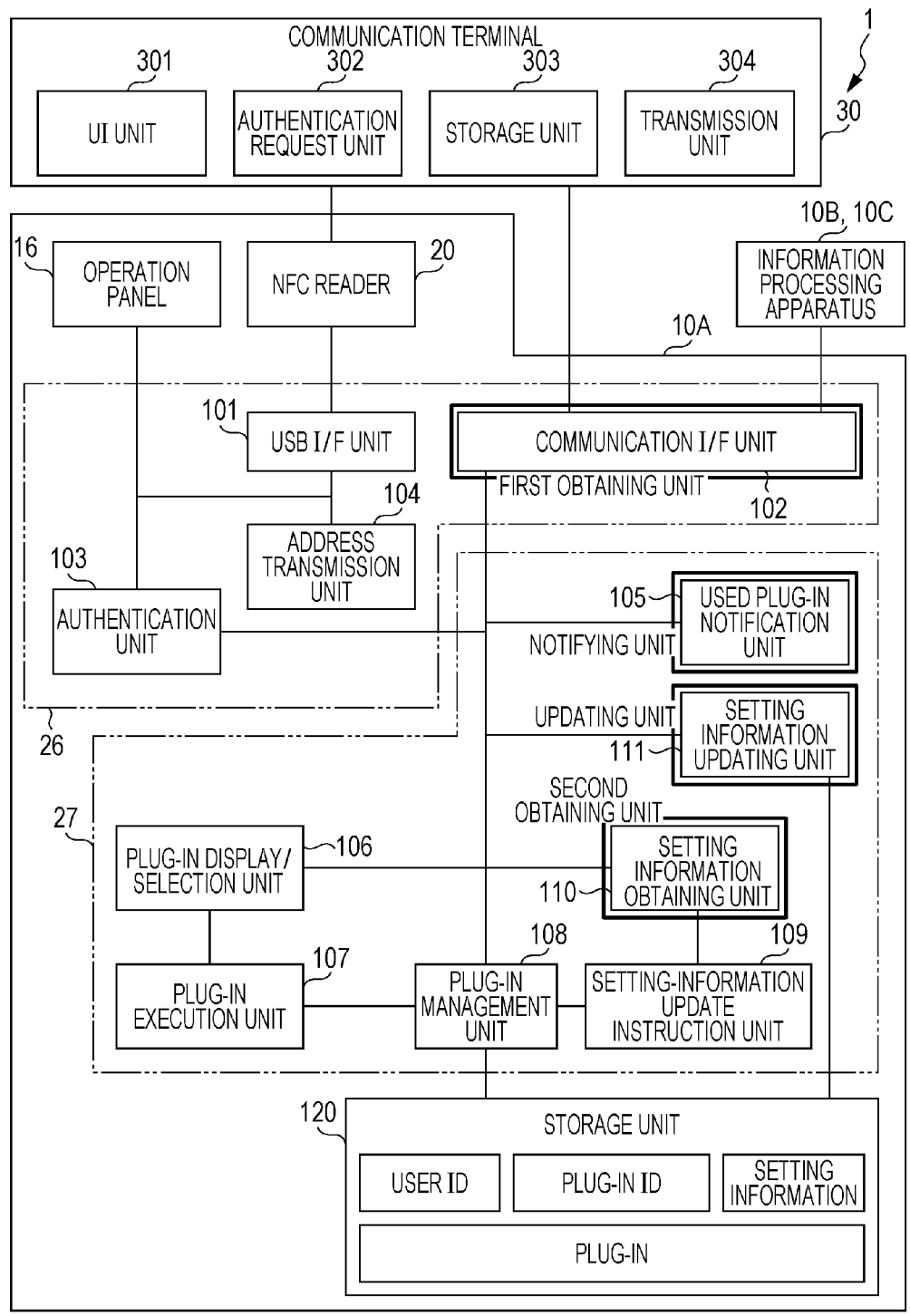
FIG. 6 illustrates a detailed module configuration of the information processing system.

FIG. 6 illustrates a detailed module configuration of the information processing system 1. The term "module" refers to a software element for implementing a corresponding function in the information processing system 1. The communication terminal 30 includes a UI unit 301, an authentication request unit 302, a storage unit 303, and a transmission unit 304. The information processing apparatus 10 includes a USB I/F unit 101, a communication I/F unit 102, an authentication unit 103, and an address transmission unit 104, which are included in the security controller 26. The information processing apparatus 10 further includes a used plug-in notification unit 105, a plug-in display/selection unit 106, a plug-in execution unit 107, a plug-in management unit 108, a setting-information update instruction unit 109, a setting information obtaining unit 110, and a setting information updating unit 111, which are included in the plug-in controller 27. The information processing apparatus 10 further includes a storage unit 120.

The USB I/F unit 101 of the information processing apparatus 10 includes a device driver for the NFC reader 20 and controls the NFC reader 20. The communication I/F unit 102 of the information processing apparatus 10 is connected to the communication terminal 30 or the other information processing apparatuses 10 (i.e., the information processing apparatuses 10B and 10C in this example) and performs Internet protocol (IP)-based communication.

The UI unit 301 of the communication terminal 30 is used as a UI when a function of the information processing apparatus 10 is utilized. The UI unit 301 is connected to the information processing apparatus 10, and displays a UI screen and accepts a user operation. More specifically, the UI unit 301 displays information provided by the information processing apparatus 10 in a UI screen, and displays images that serve as operation members in a UI screen and accepts a user operation on one of the images serving as the operation members. The UI unit 301 notifies the information processing apparatus 10 of content of the accepted operation, and consequently the information processing apparatus 10 performs an action corresponding to the operation.

In the exemplary embodiment, each of the information processing apparatuses 10 is utilized by an authenticated user. The authentication request unit 302 of the communication terminal 30 requests user authentication to allow the user to utilize the information processing apparatus 10. When the UI unit 301 accepts, for example, an operation for specifying the information processing apparatus 10 which the user wishes to utilize and an operation for inputting a user identification (ID) and a password, the authentication request unit 302 requests the specified information processing apparatus 10 to perform user authentication by using the input information. The information processing apparatus 10 may be specified in the following manner. For example, the information processing apparatuses 10 are assigned names (for example, XX department information processing apparatus) that are easily recognized by the user. The user selects the name of the information processing apparatus 10 which the user wishes to utilize from a list of the names of the information processing apparatuses 10.

The authentication unit 103 of the information processing apparatus 10 performs authentication of the user who is to utilize the information processing apparatus 10, by using the user ID and the password input, for example, from a UI unit (i.e., the operation panel 16 or the UI unit 301 of the communication terminal 30) that has been operated by the user. For example, the authentication unit 103 performs user authentication by exchanging information with an external authentication server; however, the configuration is not limited to this one. For example, the authentication unit 103 may perform user authentication by using user authentication information (such as a table in which the user ID and the password are associated with each other) stored in the information processing apparatus 10.

In the exemplary embodiment, the information processing apparatus 10 and the communication terminal 30 are connected by NFC-based peer-to-peer (P2P) communication. The address transmission unit 104 of the information processing apparatus 10 transmits address information, such as an IP address, a media access control (MAC) address, or a fully qualified domain name (FQDN) of the information processing apparatus 10 when P2P communication is performed. After the information processing apparatus 10 and the communication terminal 30 are connected via P2P communication as a result of successful authentication of the user by the authentication unit 103 and transmission of the address information by the address transmission unit 104, the information processing apparatus 10 becomes ready to be operated with the UI unit 301 of the communication terminal 30 (enters so-called a user sign-in state). Note that address information for P2 P communication may be transmitted in two ways.

The used plug-in notification unit 105 of the information processing apparatus 10 notifies the communication terminal 30, which is used as a UI of the information processing apparatus 10, of a list of plug-ins used in the information processing apparatus 10. In the exemplary embodiment, the used plug-in notification unit 105 notifies the communication terminal 30 of this used plug-in list when the user signs out. Specifically, the used plug-in notification unit 105 transmits, to the communication terminal 30, a plug-in list in which a user ID of a user who has been signed in the information processing apparatus 10, a plug-in ID for identifying a plug-in that has been used by the user, and an apparatus ID of the information processing apparatus 10 are associated with one another.

When a plug-in is used, setting information set for a function implemented by the plug-in is usually updated. Accordingly, in the case where a user utilizes a function of the information processing apparatus 10 by using the communication terminal 30, the notification made by the used plug-in notification unit 105 may be handled as a notification indicating that setting information of the function has been updated. The used plug-in notification unit 105 is an example of a "notifying unit" in an aspect of the present invention.

The setting information is not updated in some cases even when a plug-in is used. Accordingly, for example, the used plug-in notification unit 105 may transmit the used plug-in list only when the setting information is updated. Such a configuration allows the notification made by the used plug-in notification unit 105 to be handled as a notification indicating that the setting information is updated. In addition, the used plug-in notification unit 105 may notify the communication terminal 30 of information obtained by adding information denoting a plug-in for which the setting information has been updated as a result of the use thereof to the list of plug-ins used in the information processing apparatus 10.

The storage unit 303 of the communication terminal 30 stores, in association with one another, apparatus identification information for identifying the information processing apparatus 10 whose function has been utilized via the UI unit 301, user identification information for identifying a user who has utilized the function, and function identification information for identifying the function. In the exemplary embodiment, the storage unit 303 uses the apparatus ID, the user ID, and the plug-in ID that are indicated by the plug-in list transmitted from the used plug-in notification unit 105 respectively as the apparatus identification information, the user identification information, and the function identification information and stores them in association with one another. An example of the information stored in the storage unit 303, for example, in the case where a user A has utilized the information processing apparatuses 10A, 10B, and 10C will be described with reference to FIG. 7.

FIG. 7 illustrates an example of the user ID, the plug-in ID, and the apparatus ID that are stored in the storage unit 303. In the example illustrated in FIG. 7, "U001", which denotes the user ID of the user A, is associated with "P001", "P002", "P003", and "P004", which respectively denote plug-in IDs of plug-ins α, β, γ, and δ, and the plug-in IDs "P001", "P002", "P003", and "P004" are associated with "E01", "E03", "E03", and "E02", which respectively denote the apparatus IDs of the information processing apparatuses 10A, 10C, 10C, and 10B. The example illustrated in FIG. 7 indicates that the user A has utilized the plug-in α in the information processing apparatus 10A last time (most recently), has utilized the plug-ins β and γ in the information processing apparatus 10C last time, and has utilized the plug-in δ in the information processing apparatus 10B last time.

If a plug-in is utilized in another information processing apparatus 10 after this time point, the apparatus ID of that information processing apparatus 10 is stored in association with the plug-in ID of this plug-in. That is, the apparatus ID of the information processing apparatus 10 in which the user A has utilized a plug-in last time is stored in the storage unit 303. As a result, the information processing apparatus 10 that is identified by this apparatus ID is the information processing apparatus 10 that stores the latest setting information among the information processing apparatuses 10 that store the setting information of the plug-in.

The transmission unit 304 of the communication terminal 30 transmits, to the information processing apparatus 10, the apparatus identification information, the user identification information, and the function identification information that are stored in the storage unit 303. In the exemplary embodiment, the transmission unit 304 reads the apparatus identification information, the user identification information, and the function identification information from the storage unit 303 when user authentication requested by the authentication request unit 302 is successful and transmits the apparatus identification information, the user identification information, and the function identification information to the information processing apparatus 10.

The communication I/F unit 102 of the information processing apparatus 10 receives the information transmitted from the transmission unit 304. In this way, the communication I/F unit 102 obtains, from the communication terminal 30, the user identification information for identifying a user, the function identification information for identifying a function utilized by the user (e.g., a function implemented by each of the plug-ins α, β, γ, and δ), and the apparatus identification information for identifying the information processing apparatus 10 that has the function and stores the setting information of the function. As described before, the apparatus identification information is information for identifying the information processing apparatus 10 that stores the latest setting information from among the information processing apparatuses 10 that store the setting information that has been used when the user identified by the obtained user identification information has utilized the function identified by the obtained function identification information. The communication I/F unit 102 is an example of a "first obtaining unit" according to an aspect of the present invention. The communication I/F unit 102 supplies the obtained information to the setting-information update instruction unit 109.

The plug-in display/selection unit 106 of the information processing apparatus 10 causes the UI unit 301 of the communication terminal 30 or the operation panel 16 to display a UI screen for accepting an operation for a function implemented by each plug-in and accepts a selection operation performed by the user in accordance with the UI screen. The plug-in execution unit 107 of the information processing apparatus 10 executes a plug-in in accordance with the user selection operation accepted by the plug-in display/selection unit 106. Which UI screen is displayed on the UI unit (the UI unit 301 or the operation panel 16) used by the user to perform an operation and how the plug-in execution unit 107 executes a plug-in will be described with reference to FIGS. 8A and 8B.

FIGS. 8A and 8B illustrate examples of UI screens displayed on the UI unit. FIG. 8A illustrates a UI screen B1 that is displayed when a scan function is provided. The UI screen B1 includes operation member images C1, C2, C3, and C4 and choice candidate images D1, D2, and D3. In response to operation of the operation member image C1 including a character string "Back", the UI unit displays the last screen. In response to operation of the operation member image C2 including a character string "Close", the UI unit displays a menu screen, for example. In addition, in response to operation of the operation member image C3 including a character string "Sign-out", the UI unit displays a post sign-out screen.

The UI unit displays the choice candidate images D1, D2, and D3 as setting information candidates used in the scan function. The choice candidate image D1 includes a path name of a predetermined storage destination (in FIG. 8A, "Fuji Taro's Drawer>Product Concerned>Document Management"), an image indicating that the file name is subjected to "auto setting", and a display field D11 that displays a file name (in FIG. 8A, "About purchase of management software.pdf"). In the case of auto setting, for example, the UI unit generates a file name that does not coincide with any of file names of files stored in the storage destination and displays the generated file name at the display field D11. The storage destination and the file name are displayed as the setting information candidates. Note that the user may cancel the auto setting and input a file name at the display field D11. In such a case, the input file name is displayed as a setting information candidate.

The choice candidate image D2 includes items, such as "pdf" denoting the output file format and "full color" denoting the color mode, as the setting information candidates. In response to operation of a pulldown button D21, the UI unit displays a list of the setting information candidates. In response to selection of a candidate from the list by the user, the UI unit displays the choice candidate image D2 including the selected candidate. For example, in response to selection of "gif" from a list of candidates for the output file format, "gif" is displayed in place of "pdf" as a setting information candidate in the UI screen B1.

The choice candidate image D3 includes the setting information candidates that indicate whether to utilize functions of "Background Suppression", "Shadow Suppression", and "High Compression". When a checkbox D31 displayed in association with each of the functions is checked, such a state indicates that the function is to be utilized. If the checkbox D31 is not checked, such a state indicates that the function is not to be utilized. In the example illustrated in FIG. 8A, it is indicated that "Background Suppression" is to be utilized and the other two functions are not to be utilized as the setting information candidates. In response to operation of the operation member image C4 including a character string "Start Scan", the UI unit notifies the plug-in execution unit 107 of the setting information candidates selected at that time and an instruction to perform a scan process using these setting information candidates.

FIG. 8B illustrates a UI screen B2 that is displayed when a fax function is provided. The UI screen B2 includes an operation member image C5 and a choice candidate image D4. The choice candidate image D4 includes, as the setting information candidates, contact destinations such as a registered email address of the user and customers' fax numbers. When a checkbox D41 displayed in association with each of the candidates is checked, such a state indicates a fax transmission process is to be performed by using the corresponding contact destination. When the checkbox D41 is not checked, such a state indicates that a fax transmission process is not to be performed by using the corresponding contact destination. In response to operation of an operation member image C5 including a character string "Start Fax", the UI unit notifies the plug-in execution unit 107 of the contact destinations selected at that time (the setting information candidates in this example) and an instruction to perform a fax transmission process by using the contact destinations.

The plug-in execution unit 107, for example, executes a plug-in to carry out a function implemented by the plug-in and performs a process relating to the function. In the process relating to the function, setting information concerning the function is used. The plug-in execution unit 107 performs this process by using the choices selected by the user from among the setting information candidates displayed by the UI unit. For example, in response to selection of the operation member image C4 in the state illustrated in FIG. 8A, the plug-in execution unit 107 performs a scan process for scanning an image on a recording medium by using setting information indicating that the output file format is "pdf", the color mode is "full color", the original orientation is "Head to Left", the scan size is "A4 Landscape", the scan resolution is "200 dpi", the 2-sided original feeding is "2-Sided (Head to Head)", and "Background Suppression" is enabled. The plug-in execution unit 107 then assigns the file name "About purchase of management software.pdf" to the image obtained by scanning, and stores the image in the storage destination denoted by the path name "Fuji Taro's Drawer>Product Concerned>Document Management".

The setting information candidates are no longer the setting information candidates after they are used by the plug-in execution unit 107 in the process and become the setting information used in the process. The plug-in management unit 108 of the information processing apparatus 10 manages the setting information used in such a manner, by storing the setting information in the storage unit 120 on a per-plug-in and per-user basis. In this way, the storage unit 120 stores setting information that is information for indicating a condition in which the user has utilized the function of the information processing apparatus 10.

FIGS. 9A and 9B illustrate examples of setting information stored in the storage unit 120. In FIG. 9A, for example, "U001", which is the user ID of the user A, and setting information including "circular memos", which is a storage destination folder name, and "About purchase of management software", which is a file name, are associated with "P001", which is the plug-in ID of the plug-in α that implements the function for transferring a file obtained by scanning. In addition, "U001", "circular memos", and "About signing of maintenance contract"; and "U001", "commuting expenses", and "Receipt for Fuji hotel" are associated with the plug-in ID "P001". As described above, the storage unit 120 stores log records of the setting information used in the scanned file transfer function implemented the plug-in α.

FIG. 9B illustrates an example of the user ID, the setting information, and a timestamp that are stored in association with "P002", which is the plug-in ID of the plug-in β that implements a function for printing via a cloud server. In this example, information such as the "color more" and the "number of printed copies (total)" are associated as the setting information. As is clear from the above, the setting information that is stored changes depending on the function utilized. As described above, the storage unit 120 stores, in association with one another, the plug-in ID for identifying a function, the user ID for identifying a user, and the setting information that has been set for the function and the user.

The plug-in management unit 108 also manages a list of plug-ins installed on the information processing apparatus 10, by storing the list in the storage unit 120.

FIG. 10 illustrates an example of the plug-in list stored in the storage unit 120. The example in FIG. 10 illustrates a plug-in list including the plug-ins α, β, and δ that are respectively identified by the plug-in IDs "P001", "P002", and "P004".

The setting-information update instruction unit 109 of the information processing apparatus 10 issues a setting-information update instruction indicating setting information to be obtained from another information processing apparatus 10, in accordance with the apparatus identification information, the user identification information, and the function identification information that have been obtained by the communication I/F unit 102 and the list of plug-ins installed on the information processing apparatus 10.

In the case where the plug-in IDs and the apparatus IDs that are associated with the user ID "U001" illustrated in FIG. 7 are obtained and the plug-in list illustrated in FIG. 10 is stored on the information processing apparatus 10, the setting-information update instruction unit 109 compares the information illustrated in FIG. 7 with the plug-in list illustrated in FIG. 10 with each other and extracts plug-in IDs ("P002" and "P004" in this example) that are associated with the apparatus IDs of the other information processing apparatuses 10 (the information processing apparatuses 10B and 10C in this example) from among the plug-in IDs included in common ("P001", "P002", and "P004" in this example). It is assumed here that this information processing apparatus 10 is the information processing apparatus 10A assigned the apparatus ID "E01". Since the latest setting information is stored in the information processing apparatus 10A in association with the plug-in ID "P001", the setting information need not be obtained from the other information processing apparatuses 10B and 10C. In addition, since the plug-in indicated by the plug-in ID "P003" is not installed on the information processing apparatus 10A, its plug-in ID is not extracted. Each of the plug-in IDs extracted in this way identifies a plug-in for which the latest setting information is stored in another information processing apparatus 10 (the information processing apparatus 10B or 10C in this example) among the plug-ins for which the setting information is stored in the information processing apparatus 10A.

The setting-information update instruction unit 109 instructs the setting information obtaining unit 110 to obtain the setting information of the plug-in identified by the extracted plug-in ID from the information processing apparatus 10 identified by the apparatus ID associated with the plug-in ID. The setting-information update instruction unit 109 then instructs the setting information updating unit 111 to update the setting information stored in the information processing apparatus 10A to the obtained setting information. The setting-information update instruction unit 109 issues these instructions by creating an instruction message denoting instruction content and supplying the instruction message to the corresponding unit.

In the case of the examples illustrated in FIGS. 7 and 10, the setting-information update instruction unit 109 issues an instruction to obtain setting information of the plug-in β identified by the plug-in ID "P002" from the information processing apparatus 10C identified by the apparatus ID "E03" and update the setting information to the obtained one and issues an instruction to obtain setting information of the plug-in δ identified by the plug-in ID "P004" from the information processing apparatus 10B identified by the apparatus ID "E02".

The setting information obtaining unit 110 of the information processing apparatus 10 obtains the setting information specified by the setting-information update instruction unit 109 from the other information processing apparatus 10. For example, in the case of obtaining the setting information for the user A, the setting information obtaining unit 110 transmits, to the other information processing apparatus 10, request data for requesting the setting information and the plug-in ID that are stored in the storage unit 120 in association with the user ID of the user A. Upon receipt of this request data, the other information processing apparatus 10 reads the requested setting information and plug-in ID from the storage unit 120 and transmits setting information data containing the setting information and the plug-in ID to the information processing apparatus 10 that has transmitted the request.

FIG. 11 illustrates an example of the setting information data. The header of the setting information data includes a plug-in ID, a user ID, and a version of a plug-in. The setting information includes an input log, an operation log, a function setting log, and registered information. The input log is a log of setting information that is denoted by characters and numerals input by the user, such a log of file names and fax numbers. The operation log is a log of operations performed by the user, such as operations of selecting a pulldown menu and a radio button. The function setting information is setting information used by the plug-in execution unit 107 in a process. The registered information is information, such as fax numbers of fax transmission destinations and email addresses, for example. Upon receipt of the setting information data transmitted by the information processing apparatus 10, the setting information obtaining unit 110 obtains the setting information included in the setting information data.

The setting information thus obtained is setting information stored in an external apparatus (the information processing apparatus 10 other than the information processing apparatus 10A) identified by the apparatus identification information obtained by the communication I/F unit 102. In the case where the user identified by the user identification information obtained along with the apparatus identification information has utilized the function identified by the function identification information obtained along with the apparatus identification information (function of the external apparatus) in one or more information processing apparatuses 10, this setting information is the latest setting information among the setting information stored in the one or more information processing apparatuses 10 (in the case where the setting information is stored in only one information processing apparatus 10, this setting information is the setting information stored in that information processing apparatus 10). As described above, in the case where the apparatus identified by the apparatus identification information is an external apparatus, the setting information obtaining unit 110 obtains the latest setting information from the external apparatus. The setting information obtaining unit 110 is an example of a "second obtaining unit" according to an aspect of the present invention.

The setting information updating unit 111 of the information processing apparatus 10 updates the setting information (of the same function as that of the obtained setting information) stored in the storage unit 120 to the latest setting information obtained from the other information processing apparatus 10 by the setting information obtaining unit 110. The setting information updating unit 111 is an example of an "updating unit" according to an aspect of the present invention. In the exemplary embodiment, as described above, the apparatus identification information and the other identification information are obtained when user authentication is successful, and the setting information is obtained based on such identification information. Thus, the setting information updating unit 111 updates the setting information when the user is authenticated by the authentication unit 103.

In the exemplary embodiment, the setting information of a plug-in installed on the information processing apparatus 10 (i.e., a function of the information processing apparatus 10) is updated as described above. That is, the setting information updating unit 111 updates setting information of a plug-in that is installed on the information processing apparatus 10 and does not update setting information of a plug-in that is not installed on the information processing apparatus 10, among plug-ins installed on the other information processing apparatus 10 identified by the apparatus ID obtained by the communication I/F unit 102.

Now, a procedure of operations for updating setting information will be described.

Figure 12:
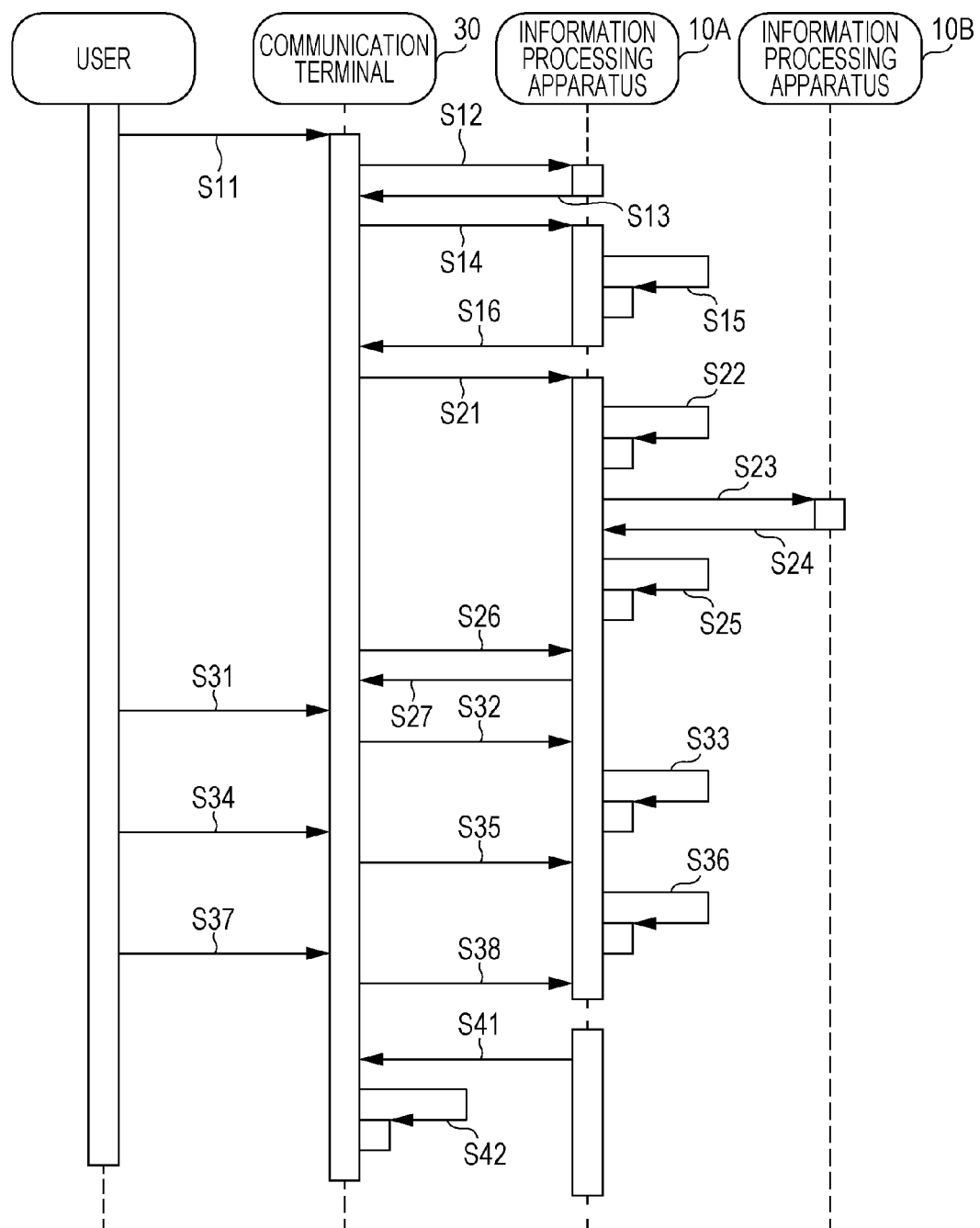
FIG. 12 illustrates an example of a procedure of operations performed by the information processing apparatuses and the communication terminal included in the information processing system.

FIG. 12 illustrates an example of a procedure of operations performed by the information processing apparatuses 10 and the communication terminal 30 of the information processing system 1. This operation procedure starts in response to an operation of signing into the information processing apparatus 10A by the user A by using the communication terminal 30. First, the communication terminal 30 accepts this operation (step S11). The communication terminal 30 then notifies the information processing apparatus 10A of the acceptance of the operation (step S12). The information processing apparatus 10A (the address transmission unit 104) transmits address information to the communication terminal 30 (step S13).

Then, the communication terminal (the authentication request unit 302) requests the information processing apparatus 10A to perform user authentication by using the user ID and the password that are input in the sign-in operation (step S14). The information processing apparatus 10A (the authentication unit 103) performs user authentication by using the user ID and the password (step S15) and notifies the communication terminal 30 of the authentication result (step S16). Note that the user may place the communication terminal 30 over the information processing apparatus 10A to perform NFC communication through operations of steps S12 and S13. Such an operation may serve as an operation for signing into the information processing apparatus 10A. As a result of the operations up to this step, the communication terminal 30 is connected as a UI of the information processing apparatus 10A.

Subsequently, the communication terminal 30 (the transmission unit 304) transmits, to the information processing apparatus 10A, the user ID of the user A and the plug-in ID and the apparatus ID that are stored in association with the user ID (e.g., information illustrated in FIG. 7), and the information processing apparatus 10A (the communication I/F unit 102) obtains the user ID, the plug-in ID, and the apparatus ID (step S21). The information processing apparatus 10A (the setting-information update instruction unit 109) creates an instruction message denoting an operation instruction to update the setting information, on the basis of the obtained information and the plug-in list stored in the information processing apparatus 10A (e.g., the list of plug-ins installed on the information processing apparatus 10A, such as the one illustrated in FIG. 10) (step S22).

In accordance with the created instruction message, the information processing apparatus 10A (the setting information obtaining unit 110) requests the information processing apparatus 10B to transmit the setting information in this example (step S23) and obtains the setting information included in setting information data (step S24), which is transmitted by the information processing apparatus 10B in response to this request. The information processing apparatus 10A (the setting information updating unit 111) then updates the setting information stored in the information processing apparatus 10A to the obtained setting information (step S25). Then, the communication terminal 30 requests a UI screen (step S26). The information processing apparatus 10A (the plug-in display/selection unit 106) transmits information representing the UI screen to the communication terminal 30 (step S27). In this way, the updated setting information is displayed in the UI screen displayed by the communication terminal 30.

Then, the communication terminal 30 (the UI unit 301) accepts a user operation of selecting a plug-in (step S31) and requests the information processing apparatus 10A to execute the selected plug-in (step S32). The information processing apparatus 10A (the plug-in execution unit 107) executes the plug-in by referring to the setting information of the function implemented by the requested plug-in (step S33).

Then, the communication terminal 30 (the UI unit 301) accepts a user operation for the plug-in being executed (step S34) and notifies the information processing apparatus 10A of the operation content (step S35). The information processing apparatus 10A (the plug-in execution unit 107) performs a process relating to the function implemented by the plug-in in accordance with the notified operation content and updates the setting information to the setting information obtained in the process (step S36). Then, the communication terminal 30 (the UI unit 301) accepts a user sing-out operation (step S37) and requests the information processing apparatus 10A to perform a sign-out process (step S38). The information processing apparatus 10A performs the sign-out process in accordance with the request.

The information processing apparatus 10A (the used plug-in notification unit 105) notifies the communication terminal 30 of the aforementioned plug-in list (a list of plug-ins used in the information processing apparatus 10A) when performing the sign-out process (step S41). Based on the notified plug-in list, the communication terminal 30 (the storage unit 303) stores, in association with one another, the apparatus ID that identifies the information processing apparatus 10A, the user ID that identifies the user A who has utilized a function in the information processing apparatus 10A, and the plug-in ID that identifies the function (step S42). If the apparatus ID that identifies another information processing apparatus 10 is already stored in association with the user ID and the plug-in ID, the apparatus ID is updated to the apparatus ID that indicates the information processing apparatus 10A.

Figure 13:
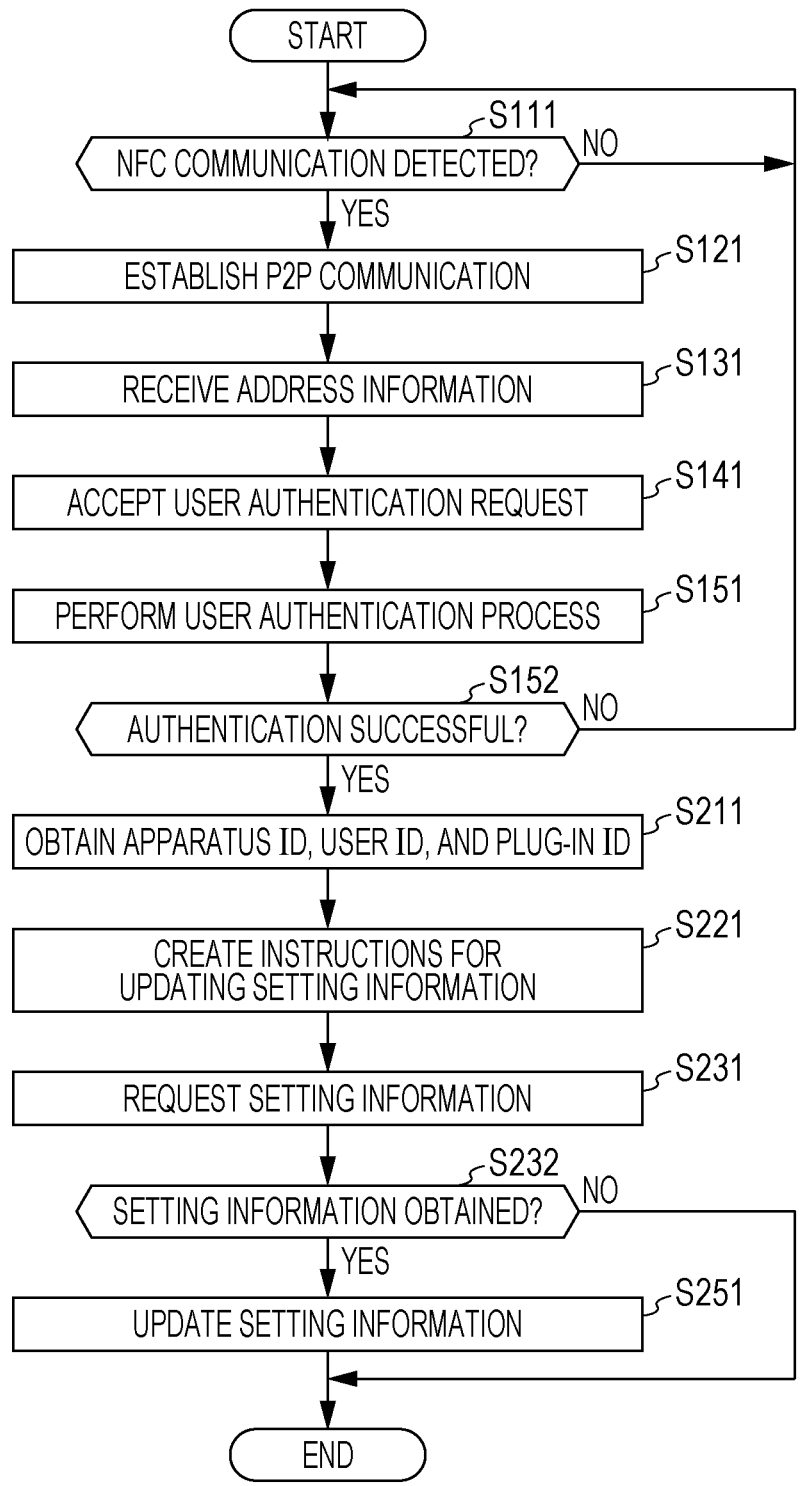
FIG. 13 illustrates an example of a procedure of an operation performed by the information processing apparatus to update setting information.

FIG. 13 illustrates an example of a procedure of an operation performed by the information processing apparatus 10 to update the setting information. The information processing apparatus 10 first determines whether NFC communication with the communication terminal 30 is detected (step S111). The information processing apparatus 10 repeatedly performs this operation until it determines that NFC communication is detected (YES). If the information processing apparatus 10 determines that NFC communication is detected (YES), the information processing apparatus 10 establishes P2P communication to the communication terminal 30 (step S121) and exchanges address information with the communication terminal 30 (step S131).

Then, the information processing apparatus 10 accepts a user authentication request from the communication terminal 30 (step S141) and performs a user authentication process (step S151). The information processing apparatus 10 determines whether the user authentication is successful (step S152). If it is determined that the user authentication is not successful (NO), the process returns to step S111, in which the information processing apparatus 10 performs the corresponding operation. If it is determined that the user authentication is successful (YES), the information processing apparatus 10 obtains the apparatus ID, the user ID, and the plug-in ID from the communication terminal 30 (step S211).

Then, the information processing apparatus 10 creates an instruction message to update the setting information, in accordance with the user ID, the apparatus ID, and the plug-in ID that have been obtained and the plug-in list stored in the information processing apparatus 10 (step S221). Then, the information processing apparatus 10 requests the other information processing apparatus 10 to transmit setting information based on the created instruction message (step S231) and determines whether the setting information is obtained (step S232). If it is determined that the setting information is obtained (YES), the information processing apparatus 10 updates the setting information stored in the information processing apparatus 10 to the obtained setting information (step S251) and ends this operation procedure. If it is determined that the setting information is not obtained (NO), the information processing apparatus 10 ends this operation procedure.

Figure 14:
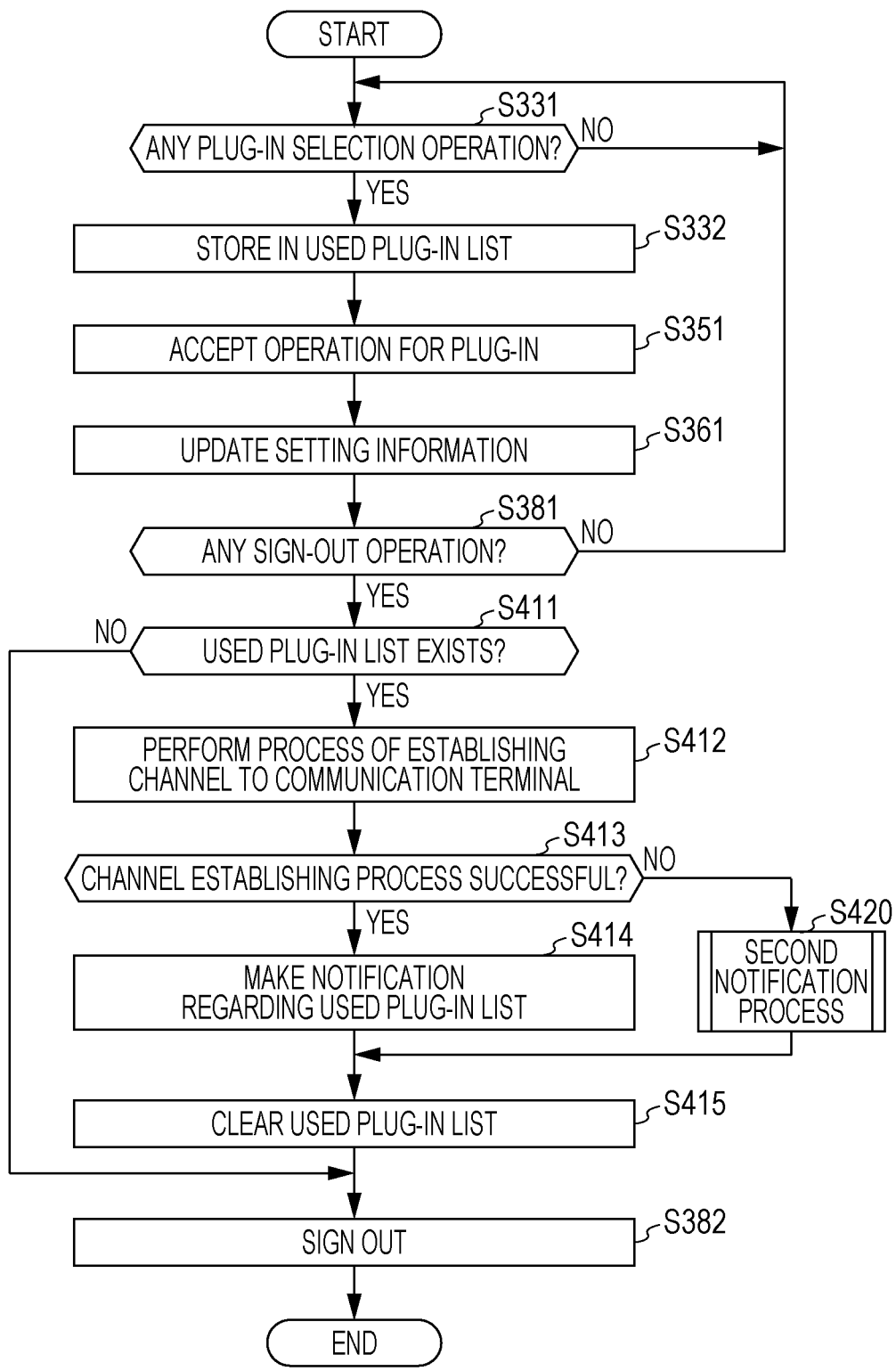
FIG. 14 illustrates an example of a procedure of an operation for transmitting a used plug-in list.

FIG. 14 illustrates an example of a procedure of an operation for transmitting the used plug-in list. The information processing apparatus 10 determines whether a plug-in selection operation is performed by a user (step S331). The information processing apparatus 10 repeatedly performs this operation until it is determined that a plug-in is selected (YES). If it is determined that a plug-in is selected (YES), the information processing apparatus 10 starts the plug-in and stores the plug-in ID of the plug-in in the used plug-in list (step S332). At that time, if the used plug-in list is not stored in the information processing apparatus 10, the information processing apparatus 10 newly creates and stores therein a used plug-in list. Then, the information processing apparatus 10 accepts a user operation for the started plug-in (step S351) and updates setting information of the function implemented by the plug-in for which the operation has been accepted (step S361).

Then, the information processing apparatus 10 determines whether a sign-out operation is performed by the user (step S381). If it is determined that a sign-out operation is not performed (NO), the process returns to step S331, in which the information processing apparatus 10 performs the aforementioned operation. If it is determined that a sign-out operation is performed (YES) in step S381, the information processing apparatus 10 determines whether there is a used plug-in list (step S411). If it is determined that there is no used plug-in list (NO), the information processing apparatus 10 performs a sign-out process (step S382) and ends this operation procedure. If it is determined that there is a used plug-in list (YES), the information processing apparatus 10 performs a process of establishing a communication channel over mobile communication or wireless LAN communication, for example (step S412).

Then, the information processing apparatus 10 determines whether a communication channel has been successfully established (step S413). If it is determined that a communication channel has been successfully established (YES), the information processing apparatus 10 notifies the communication terminal 30 of the used plug-in list via the communication channel that has been established (step S414). If it is determined that establishing a communication channel has failed in step S413 (NO), the information processing apparatus 10 performs a second notification process (details of which will be described later) in which the communication terminal 30 is notified of the used plug-in list by using another method (step S420). After notifying the communication terminal 30 of the used plug-in list in step S414 or S420, the information processing apparatus 10 clears the used plug-in list (deletes the used plug-in list from the storage unit 120) (step S415). The information processing apparatus 10 performs a sign-out process, and then ends this operation procedure.

Figure 15:
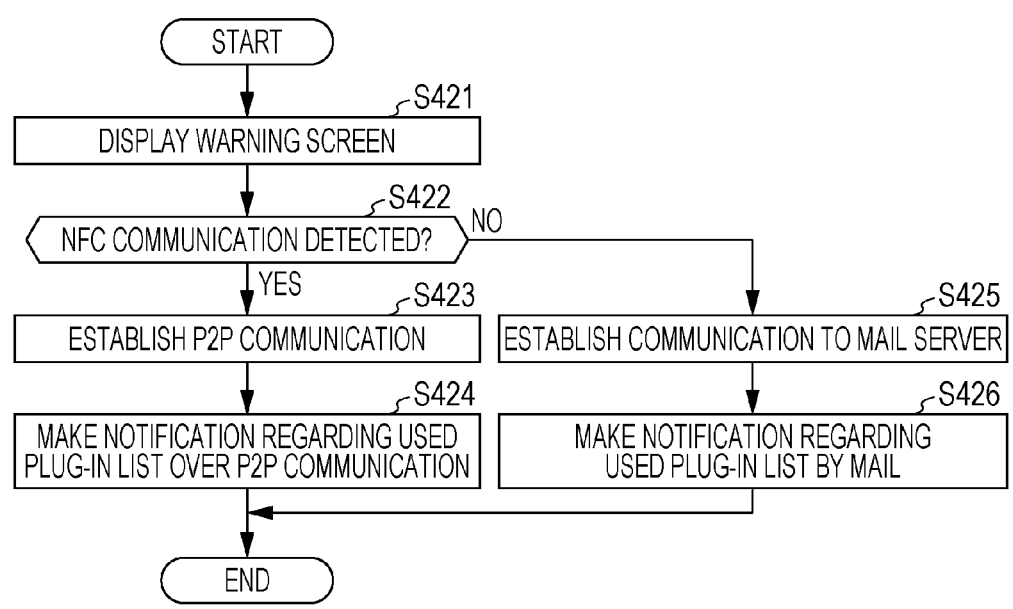
FIG. 15 illustrates an example of a procedure of an operation performed by the information processing apparatus in a second notification process.

FIG. 15 illustrates an example of a procedure of an operation performed by the information processing apparatus 10 in the second notification process. If the information processing apparatus 10 determines that establishing a communication channel has failed in step S413 in FIG. 14, the information processing apparatus 10 first displays a warning screen indicating the failure on the operation panel 16 of the information processing apparatus 10 (step S421). Then, the information processing apparatus 10 determines whether NFC communication is detected (step S422). If the information processing apparatus 10 determines that NFC communication is detected (YES), the information processing apparatus 10 establishes P2P communication based on the detected NFC communication (step S423).

Then, the information processing apparatus 10 notifies the communication terminal 30 of the used plug-in list via P2P communication that has been established (step S424) and ends this operation procedure. If the information processing apparatus 10 determines in step S422 that NFC communication is not detected (NO), the information processing apparatus 10 establishes communication to a mail server that is registered in advance (step S425). Then, the information processing apparatus 10 sends a notification of the used plug-in list to the user's email address (step S426) and ends this operation procedure.

2. Modifications

The exemplary embodiment described above is merely an example of how the present invention is embodied, and the exemplary embodiment may be modified in the following manner. In addition, the exemplary embodiment described above and each modification described below may be carried out in combination as needed.

2-1. UI

In the exemplary embodiment, the communication terminal 30 is used as a UI to perform various operations; however, the operation panel 16 of the information processing apparatus 10 may be used as a UI. A procedure of operations in that case will be described with reference to FIGS. 16 to 18.

Figure 16:
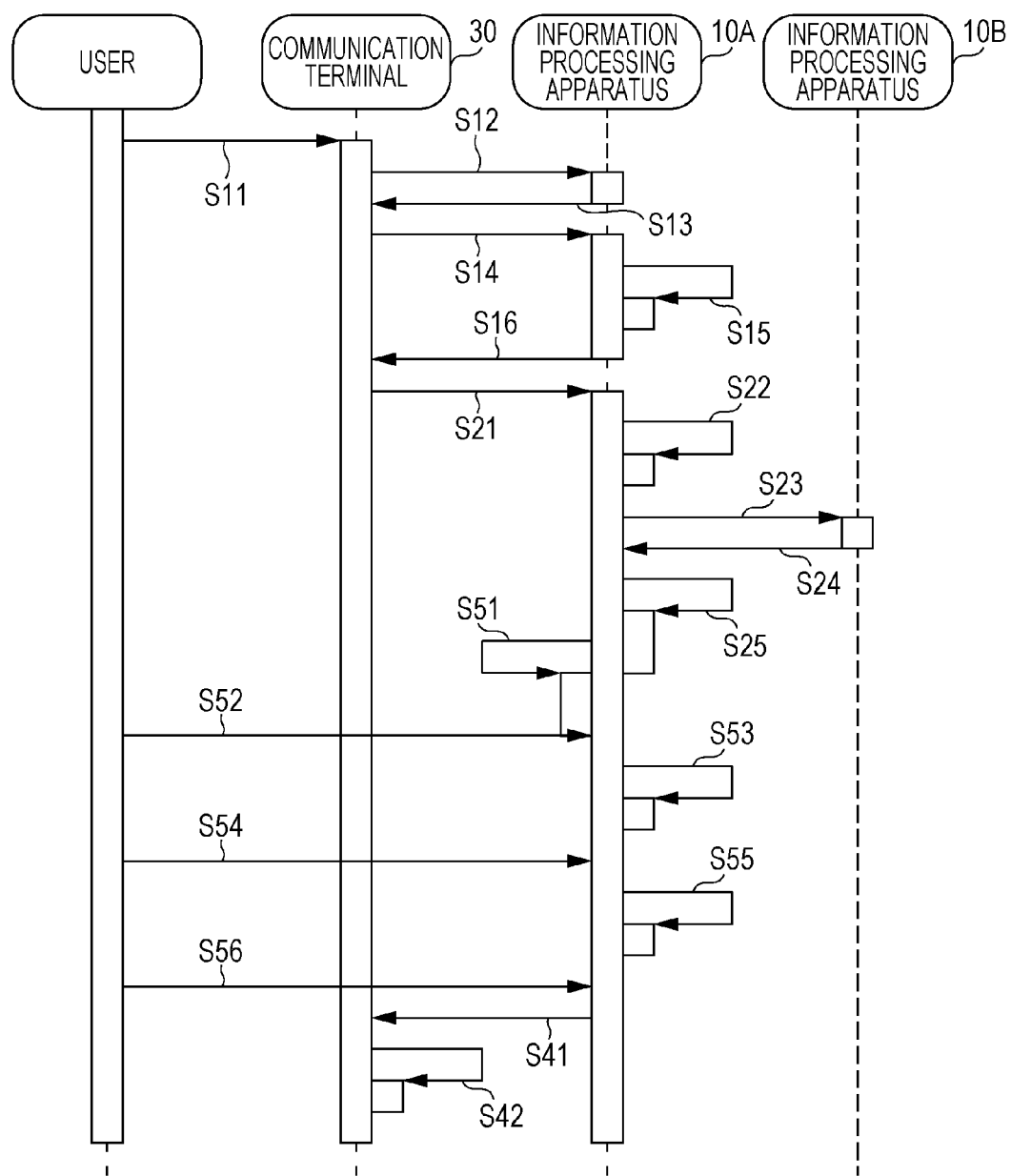
FIG. 16 illustrates an example of a procedure of operations performed by the information processing apparatuses and the communication terminal included in the information processing system according to a modification.

FIG. 16 illustrates an example of a procedure of operations performed by the information processing apparatuses 10A and 10B and the communication terminal 30 of the information processing system 1 according to a modification. In the example in FIG. 16, operations of steps S11

(accepting a sign-in operation) to S25 (updating setting information) illustrated in FIG. 12 are performed. Then, the information processing apparatus 10A (the plug-in display/selection unit 106) supplies information representing a UI screen to the operation panel 16 of the information processing apparatus 10A (step S51). If the user performs an operation of selecting a plug-in in accordance with information indicated in the UI screen displayed on the operation panel 16, the information processing apparatus 10A accepts the operation (step S52). The information processing apparatus 10A (the plug-in execution unit 107) executes the plug-in by referring to the setting information of a function implemented by the plug-in for which the operation has been accepted (step S53).

Then, the information processing apparatus 10A (the operation panel 16) accepts a user operation for the plug-in being executed (step S54). The information processing apparatus 10A (the plug-in execution unit 107) performs a process relating to the function implemented by the plug-in, on the basis of the notified operation content, and updates the setting information to information that has been changed in the process (step S55). Then, the information processing apparatus 10A (the operation panel 16) accepts a user sign-out operation (step S56) and performs a sign-out process in response to the request.

Figure 17:
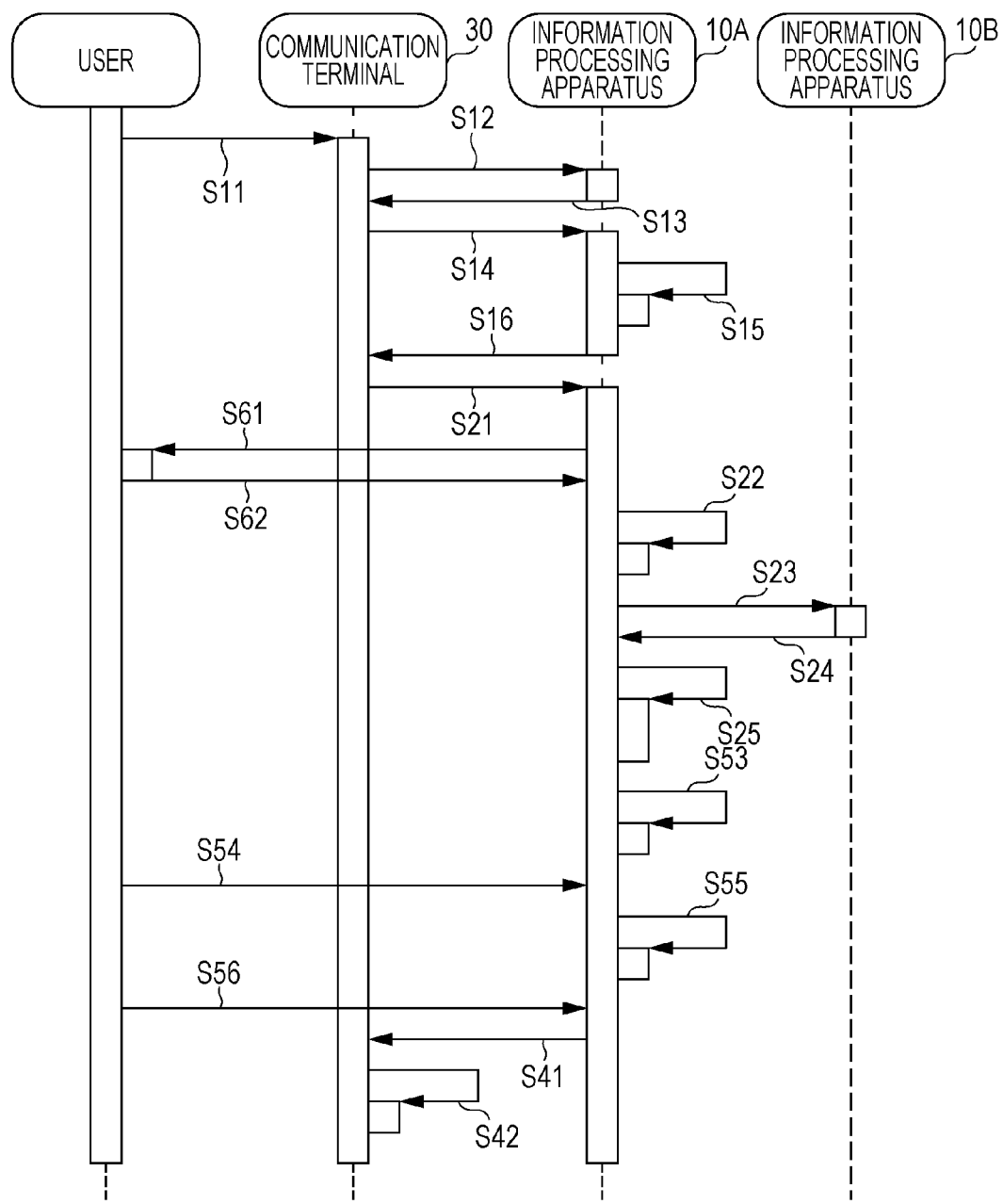
FIG. 17 illustrates another example of a procedure of operations performed by the information processing apparatuses and the communication terminal included in the information processing system according to the modification.

FIG. 17 illustrates another example of a procedure of operations performed by the information processing apparatuses 10A and 10B and the communication terminal 30 of the information processing system 1 according to the modification. In the example in FIG. 17, operations of steps S11 (accepting a sign-in operation) to S21 (notification of the user ID and the like) illustrated in FIG. 12 are performed. Then, the information processing apparatus 10A (the plug-in display/selection unit 106) supplies information representing a UI screen to the operation panel 16 of the information processing apparatus 10A (step S61). If the user performs an operation of selecting a plug-in in accordance with the information indicated in the UI screen displayed on the operation panel 16, the information processing apparatus 10A accepts the operation (step S62). In this example, operations of steps S22 (creating an instruction message to update setting information) to S25 (updating the setting information) are performed in response to selection of the plug-in in this way, and consequently the setting information is updated. Operations from step S53 (executing the plug-in) illustrated in FIG. 16 are performed by using the updated setting information.

Figure 18:
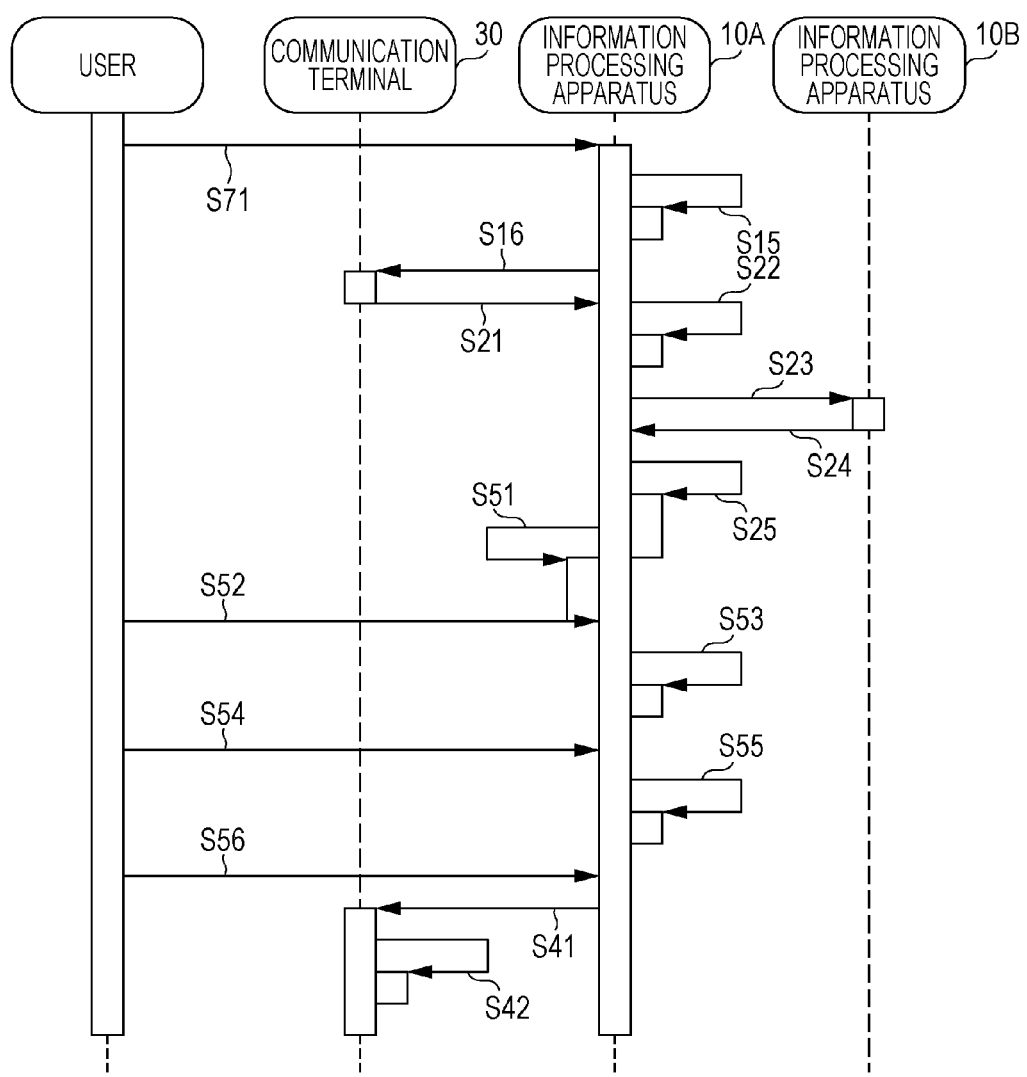
FIG. 18 illustrates another example of a procedure of operations performed by the information processing apparatuses and the communication terminal included in the information processing system according to the modification.

FIG. 18 illustrates another example of a procedure of operations performed by the information processing apparatuses 10A and 10B and the communication terminal 30 of the information processing system 1 according to the modification. In the example in FIG. 18, the information processing apparatus 10A (the operation panel 16) accepts a sign-in operation (step S71) in place of the communication terminal 30 in step S11 (accepting a sign-in operation) illustrated in FIG. 16. Thereafter, operations from step S15 (user authentication) illustrated in FIG. 16 are performed.

2-2. Update Instruction

In the exemplary embodiment, the information processing apparatus 10 issues an instruction to update setting information stored therein; however, the configuration is not limited to this one, and the communication terminal 30 may issue this instruction. A procedure of operations performed in that case will be described with reference to FIGS. 19 to 21.

Figure 19:
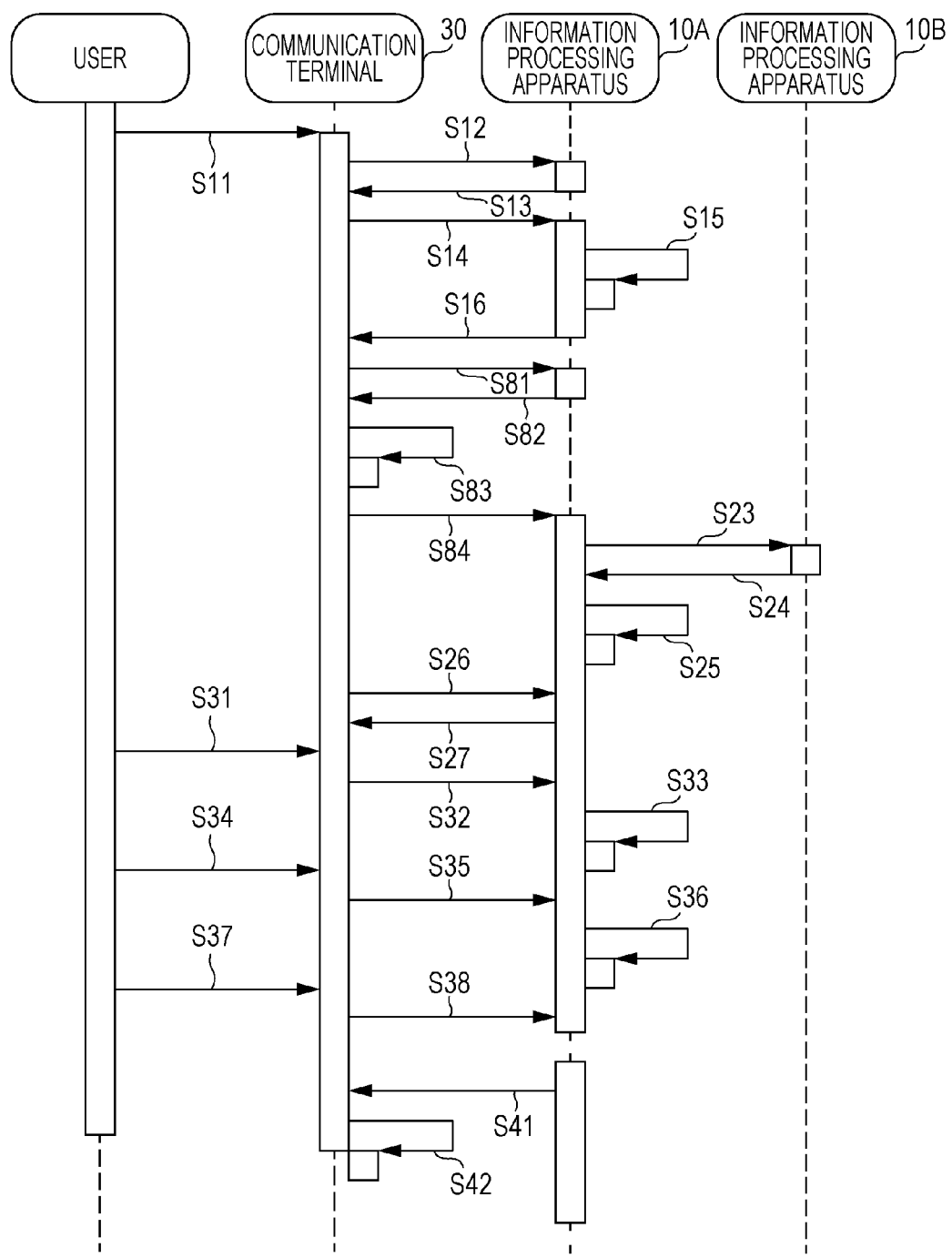
FIG. 19 illustrates an example of a procedure of operations performed by the information processing apparatuses and the communication terminal included in the information processing system according to a modification.

FIG. 19 illustrates an example of a procedure of operations performed by the information processing apparatuses 10A and 10B and the communication terminal 30 of the information processing system 1 according to a modification. In the example in FIG. 19, operations of steps S11 (accepting a sign-in operation) to S16 (authentication result notification) illustrated in FIG. 12 are performed. Then, the communication terminal 30 requests the information processing apparatus 10A to transmit a plug-in list such as the one illustrated in FIG. 10 (step S81). The information processing apparatus 10A transmits the requested plug-in list to the communication terminal 30 (step S82).

The communication terminal 30 creates an instruction message denoting an instruction to update the setting information, in accordance with the plug-in list that has been transmitted thereto and the user ID, the plug-in ID, and the apparatus ID that are stored in the communication terminal 30 (step S83) and transmits the created instruction message to the information processing apparatus 10A (step S84). Thereafter, operations from step S23 (requesting the setting information) illustrated in FIG. 12 are performed. In this example, the communication terminal 30 has a function that corresponds to the setting-information update instruction unit 109 of the information processing apparatus 10. This function is a function for instructing the information processing apparatus 10 to update the setting information stored in the information processing apparatus 10 to the latest setting information. Accordingly, this function is an example of an "instructing unit" according to an aspect of the present invention.

FIG. 20 illustrates another example of a procedure of operations performed by the information processing apparatuses 10A and 10B and the communication terminal 30 of the information processing system 1 according to the modification. In the example in FIG. 20, operations from step S11 (accepting a sign-in operation) to S84 (transmission of an instruction message) illustrated in FIG. 19 are performed. Thereafter, operations from step S23 (requesting the setting information) illustrated in FIG. 16 are performed.

FIG. 21 illustrates another example of a procedure of operations performed by the information processing apparatuses 10A and 10B and the communication terminal 30 of the information processing system 1 according to the modification. In the example in FIG. 21, operations from step S71 (accepting a sign-in operation) to step S15 (user authentication) illustrated in FIG. 18 are performed. Then, operations of step S82 (transmitting the plug-in list), step S83 (creating an instruction message), and step S84 (transmitting the instruction message) illustrated in FIG. 19 are performed. Thereafter, operations from step S23 (requesting setting information) illustrated in FIG. 16 are performed.

2-3. Updating Setting Information in Other Apparatuses

In the exemplary embodiment, the setting information stored in the information processing apparatus 10 that is being utilized by the user is updated; however, the setting information stored in the other information processing apparatus 10 may be updated at that time. For example, the setting-information update instruction unit 109 of the information processing apparatus 10A identifies the latest setting information from among the pieces of setting information used in the other information processing apparatuses 10 and the information processing apparatus 10A, based on the apparatus ID, the user ID, and the plug-in ID obtained by the communication I/F unit 102.

For example, suppose that the apparatus IDs, the user ID, and the plug-in IDs illustrated in FIG. 7 are obtained by the communication I/F unit 102 of the information processing apparatus 10A having the plug-ins α, β, and δ installed thereon as indicated by the example in FIG. 10. In such a case, as for the setting information of the plug-in α (assigned the plug-in ID "P001") that is set for the user A (assigned the user ID "U001"), the setting-information update instruction unit 109 identifies that the setting information used in the information processing apparatus 10A that is identified by the apparatus ID "E01" associated with "P001" is the latest setting information, among pieces of the setting information associated with the plug-in α.

In addition, as for the setting information of the plug-in β (assigned the plug-in ID "P002") set for the user A, the setting-information update instruction unit 109 identifies that the setting information used in the information processing apparatus 10C identified by the apparatus ID "E03" associated with "P002" is the latest setting information, among pieces of the setting information associated with the plug-in β. As for the setting information of the plug-in δ (assigned the plug-in ID "P004") set for the user A, the setting-information update instruction unit 109 identifies the setting information used in the information processing apparatus 10B identified by the apparatus ID "E02" associated with "P004" is the latest setting information, among pieces of setting information associated with the plug-in δ.

The setting-information update instruction unit 109 notifies the setting information obtaining unit 110 of the identified apparatus that stores the latest setting information and the plug-in that uses the setting information. The setting information obtaining unit 110 obtains, from the notified apparatus, the setting information used by the notified plug-in (i.e., the latest setting information for the plug-in). In the example described above, the setting information obtaining unit 110 requests the information processing apparatus 10B to transmit the setting information of the plug-in δ and obtains the setting information and also requests the information processing apparatus 10C to transmit the setting information of the plug-in β and obtains the setting information. The setting information obtaining unit 110 then supplies the obtained setting information to the setting information updating unit 111.

The setting information updating unit 111 updates the setting information that is used in the external apparatus and the information processing apparatus 10A and that is not the latest one to the latest setting information supplied thereto in this way. First, the setting information updating unit 111 updates the setting information stored in the information processing apparatus 10A to the supplied setting information. Then, the setting information updating unit 111 transmits, to the information processing apparatuses 10B and 10C, the supplied setting information in association with the user ID of the user A and the plug-in ID of the plug-in to request the information processing apparatuses 10B and 10C to update the setting information stored in the information processing apparatuses 10B and 10C to the supplied setting information.

Upon receipt of this request, the setting information updating unit 111 of the information processing apparatuses 10B and 10C updates the corresponding setting information (the setting information for the plug-ins α, β, and δ set for the user A) stored in the information processing apparatuses 10B and 10C to the transmitted setting information. Note that updating in the information processing apparatus 10A and updating in the external apparatus may be performed in any order or in parallel. In this way, when the setting information for a function is updated, the setting information updating unit 111 updates the setting information of the function used in the external apparatus to the updated setting information.

In the modification, for example, the used plug-in notification unit 105 notifies the communication terminal 30 that the setting information stored in the external apparatus and the information processing apparatus 10A has been updated. After the updating, the setting information for the user A for the plug-ins α, β, and δ used by the information processing apparatus 10A is updated to the latest one in all the information processing apparatuses 10A, 10B, and 10C. Accordingly, the storage unit 303 of the communication terminal 30 may set a single apparatus ID associated with the user ID of the user A and the plug-in IDs of the plug-ins α, β, and δ or may keep the original state. The used plug-in notification unit 105 is an example of a "notifying unit" according to an aspect of the present invention. Note that the setting information updating unit 111 or the setting-information update instruction unit 109 may make this notification in place of the used plug-in notification unit 105.

2-4. Installing Plug-in

In the exemplary embodiment, the information processing apparatus 10 does not update setting information for a plug-in that is not installed thereon; however, the information processing apparatus 10 may update such setting information after installing the plug-in thereon. In this modification, for example, in the case where the information processing apparatus 10 does not have a function identified by the function identification information obtained by the communication I/F unit 102, the plug-in management unit 108 installs the function on the information processing apparatus 10.

FIG. 22 illustrates an overall configuration of an information processing system 1a according to the modification. The information processing system 1a includes a plug-in distribution apparatus 3 in addition to the information processing apparatuses 10A, 10B, and 10C and the communication terminal 30 illustrated in FIG. 1. The plug-in distribution apparatus 3 stores plug-ins and distributes data (such as an installer file) used for installing a plug-in in response to a request from the information processing apparatus 10. For example, the information processing apparatus 10A has functions implemented by the plug-ins α, β, and δ but does not have a function implemented by the plug-in γ identified by the plug-in ID "P003" (the function identification information in this case) illustrated in FIG. 7.

In such a case, the plug-in management unit 108 requests the plug-in distribution apparatus 3 to transmit the plug-in γ. The plug-in management unit 108 then installs the plug-in γ onto the information processing apparatus 10 by using the data transmitted in response to the request. In this way, the function implemented by the plug-in γ is installed on the information processing apparatus 10. After the installation of the plug-in γ, the setting-information update instruction unit 109 instructs the setting information obtaining unit 110 to obtain the setting information from the information processing apparatus 10C that stores the latest setting information for the plug-in γ, and the setting information obtaining unit 110 obtains the specified setting information. The setting information updating unit 111 updates the setting information of the function that has been installed by the plug-in management unit 108, to the setting information obtained in this way. In this modification, setting information of a function which the information processing apparatus 10 has not had is also updated, as described above.

2-5. Timing of Updating

In the exemplary embodiment, the setting information is updated when user authentication is successful; however, the timing at which the setting information is updated is not limited to this timing. For example, the setting information updating unit 111 may update the setting information of a function that is implemented by a plug-in when a user who utilizes the information processing apparatus 10 performs an operation for starting utilization of the function. In this case, the setting information obtaining unit 110 may obtain the setting information in advance or in response to this operation. The time taken from when the operation is performed to when the setting information is updated is shorter in the former case than in the latter case. In the latter case, the setting information is always updated to the latest setting information.

2-6. Timing of Obtaining

In the exemplary embodiment, the apparatus ID, the user ID, and the plug-in ID are obtained when the user authentication is successful; however, the timing at which the apparatus ID, the user ID, and the plug-in ID are obtained is not limited to this timing. For example, the transmission unit 304 of the communication terminal 30 may transmit, to the information processing apparatus 10, the apparatus ID, the user ID, and the plug-in ID when utilization of the function is started via the UI unit, and the communication I/F unit 102 of the information processing apparatus 10 may obtain the apparatus ID, the user ID, and the plug-in ID at this timing. With this configuration, for example, in the case where user authentication is successful but the user does not utilize the function implemented by a plug-in, unnecessary communication is no longer performed to obtain the apparatus ID, the user ID, and the plug-in ID.

2-7. Selecting Update Target

The user may select a function for which the setting information is to be updated. In this case, for example, the plug-in display/selection unit 106 displays a menu screen, and the user operates the UI unit 301 of the communication terminal 30 to perform an operation of selecting a function to utilize. Based on this operation, the plug-in display/selection unit 106 selects the function to be utilized by the user and notifies the setting-information update instruction unit 109 of the plug-in that implements the selected function. The plug-in display/selection unit 106 is an example of a "selecting unit" according to an aspect of the present invention.

The setting-information update instruction unit 109 issues a setting information update instruction for a function whose setting information used in the information processing apparatus 10 is not the latest one, from among the functions which the information processing apparatus 10 is notified of by the plug-in display/selection unit 106. For example, the user ID, the plug-in IDs, and the apparatus IDs illustrated in FIG. 7 are obtained by the communication I/F unit 102 and the information processing apparatus 10 is notified of the plug-ins α and β. In this case, since the plug-in α is associated with the apparatus ID (the apparatus ID "P001") of the information processing apparatus 10, the setting-information update instruction unit 109 determines that the latest setting information is stored in the information processing apparatus 10 and does not issue any update instruction.

On the other hand, the plug-in β is associated with the apparatus ID (the apparatus ID "P002") of the other information processing apparatus 10, the setting-information update instruction unit 109 determines that the latest setting information is not stored in the information processing apparatus 10 and issues an update instruction. In this example, the setting-information update instruction unit 109 instructs the setting information obtaining unit 110 to obtain the setting information stored in the information processing apparatus 10C identified by the apparatus ID "E03" and also instructs the setting information updating unit 111 to update the setting information stored in the information processing apparatus 10 to the obtained setting information. In this way, the setting information updating unit 111 updates the setting information of the function for which the setting information used in the information processing apparatus 10 is not the latest one, among functions selected by the plug-in display/selection unit 106.

2-8. Difference in Setting Item

The setting information sometimes includes plural setting items that change depending on the version of the plug-in. For example, in the case where the scan function is provided as illustrated in FIG. 8A, six setting items from "Output File Format" to "2-Sided Original Feeding" are settable for version 1.0 of the plug-in, whereas seven setting items additionally including "Image Quality of Original" are settable for version 2.0.

Suppose that the version of the plug-in installed on the information processing apparatus 10A is version 2.0, and the version of the plug-in installed on the information processing apparatus 10B is version 1.0, for example. In such a case, if the setting information updating unit 111 of the information processing apparatus 10A updates the setting information stored in the information processing apparatus 10A to the setting information stored in the information processing apparatus 10B, the setting item "Image Quality of Original" is not updated because it is not included in the setting information stored in the information processing apparatus 10B. Accordingly, in the case where there is a setting item that is not updated by the setting information updating unit 111 as in this case, for example, the plug-in display/selection unit 106 may display a screen for setting such a setting item. The plug-in display/selection unit 106 is an example of a "first display controller" according to an aspect of the present invention.

FIG. 23 illustrates an example of a UI screen displayed on the UI unit according to the modification. The example illustrated in FIG. 23 illustrates a UI screen B3 that includes six setting items included in the choice candidate image D2 illustrated in FIG. 8A and a setting candidate image D12 for setting the "Image Quality of Original". The setting candidate image D12 includes three setting information candidates that are "Standard", "High Definition", and "High Quality". As a result of selection of one of these candidates by the user, setting information is set for the setting item "Image Quality of Original" that is not updated.

2-9. Plug-in Information List

When information indicating a plug-in (such as a name of the plug-in) is displayed on the UI unit, the information may be displayed so that the location at which the latest setting information is stored is indicated. For example, the plug-in display/selection unit 106 displays information denoting the function identified by the function identification information obtained by the communication I/F unit 102 on the UI unit. The plug-in display/selection unit 106 is an example of a "second display controller" according to an aspect of the present invention.

The plug-in display/selection unit 106 changes a display style of information denoting a function for which setting information that is newer than the setting information stored in the external apparatus is stored in the information processing apparatus 10 (i.e., a function for which the latest setting information is stored in the information processing apparatus 10) from a display style of information denoting the other function.

Figure 24:
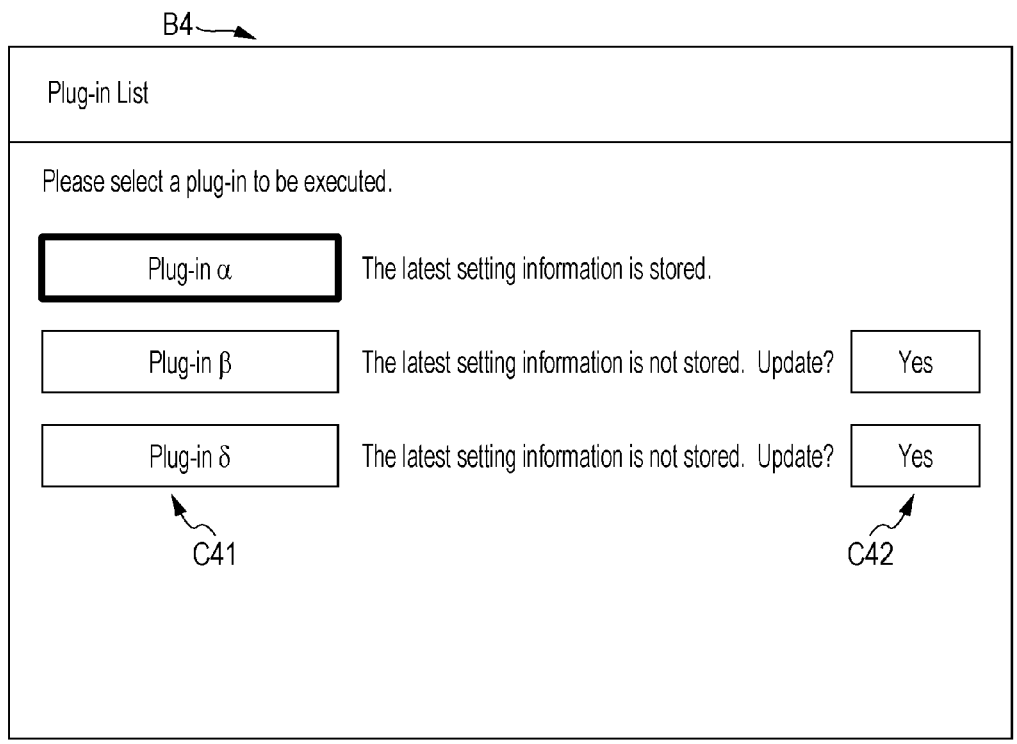
FIG. 24 illustrates an example of a UI screen displayed on the UI unit according to a modification.

FIG. 24 illustrates an example of a UI screen displayed on the UI unit according to a modification. The example in FIG.

24 illustrates a UI screen B4 in which the names "Plug-in α", "Plug-in β", and "Plug-in δ" of the plug-ins are shown as the plug-in list. These names are denoted by an operation member image group C41, and the plug-in having the selected name is to be executed.

The operation member image of "Plug-in α" is displayed together with a thicker frame than those attached to the operation member images of "Plug-in β" and "Plug-in δ". In addition, a character string "The latest setting information is stored." is displayed on the right of the operation member image of "Plug-in α". On the other hand, a character string "The latest setting information is not stored. Update?" and an operation member image group C42 including a character string "Yes" are displayed on the right of the operation member images "Plug-in β" and "Plug-in δ". If the user operates this operation member image, a process of updating the setting information of the corresponding plug-in is to be performed.

In the example in FIG. 24, the user checks whether the setting information is the latest one before executing the plug-in and executes the plug-in after updating the setting information if necessary. The display style of the plug-in information is changed by changing thickness of the frame and the sentence denoted by the neighboring character string in the example in FIG. 24; however, the way of changing the display style is not limited to this one. For example, the color, shape, or size may be changed, or how the plug-in information varies over time may be changed. In either case, it is desirable that information denoting a function for which the latest setting information is stored in the information processing apparatus 10 and information indicating the other function are easily distinguished from each other.

2-10. Notification Method

In the exemplary embodiment, the used plug-in notification unit 105 notifies the communication terminal 30 of a plug-in list via P2P communication established between the information processing apparatus 10 and the communication terminal 30; however, the notification method is not limited to this one. For example, this notification may be transmitted to a user's email address or social networking service (SNS) account that is registered in association with the communication terminal 30. In this case, the storage unit 303 of the communication terminal 30 stores, in association with one another, the apparatus ID, the user ID, and the plug-in ID that are denoted by the plug-in list (the plug-in list which the communication terminal 30 is notified of by the used plug-in notification unit 105) included in the received email or SNS post.

2-11. Informing Notification Impossible State

If P2P communication between the information processing apparatus 10 and the communication terminal 30 is disconnected when the user signs out, the notification is no longer made by the used plug-in notification unit 105. In such a case, for example, the plug-in display/selection unit 106 may display a message on the operation panel 16 to enable notification of the plug-in list.

Figure 25:
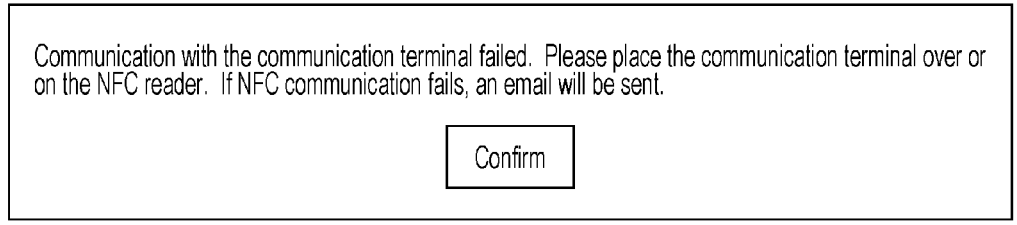
FIG. 25 illustrates an example of a UI screen displayed on the UI unit according to a modification.

FIG. 25 illustrates an example of a UI screen displayed on the UI unit according to a modification. The example in FIG. 25 illustrates a UI screen B5 including a character string "Communication with the communication terminal failed. Please place the communication terminal over or on the NFC reader. If NFC communication fails, an email will be sent." In this case, the used plug-in notification unit 105 transmits the plug-in list by email if P2P communication is not established over NFC communication before a predetermined period passes.

2-12. Last Update Date/Time

The used plug-in notification unit 105 may notify the communication terminal 30 of the plug-in list including the last update date/time of the setting information in addition to the apparatus ID, the user ID, and the plug-in ID. In this case, the storage unit 303 of the communication terminal 30 stores the last update date/time denoted by the plug-in list in association with the apparatus ID, the user ID, and the plug-in ID. In addition, the communication I/F unit 102 obtains the last update date/time together with the apparatus ID, the user ID, and the plug-in ID.

For example, suppose that the latest setting information for the plug-in α is stored in the information processing apparatus 10B, and the setting information stored in the information processing apparatus 10A is updated to the latest setting information, and then the setting information is further updated due to the use of the corresponding function by the user but notification made by the used plug-in notification unit 105 of the information processing apparatus 10A fails due to a reason such as communication error. In such a case, the apparatus ID stored in the storage unit 303 in association with the plug-in ID of the plug-in α is supposed to be updated to the apparatus ID that identifies the information processing apparatus 10A; however, it is not updated and is still the apparatus ID that identifies the information processing apparatus 10B.

The apparatus ID associated with the plug-in ID of the plug-in α obtained by the communication I/F unit 102 of the information processing apparatus 10A identifies the information processing apparatus 10B, and the latest update date/time associated with the plug-in ID is older than the last update date/time associated with the setting information stored in the information processing apparatus 10A. In such a case, the setting-information update instruction unit 109 does not issue a setting information update instruction. Updating the setting information to the older one is prevented by storing and obtaining the last update date/time as well.

2-13. Programs other than Plug-ins

In the exemplary embodiment, the case where the setting information of a plug-in is updated has been described. Setting information of a program other than plug-ins may be updated. A program for which setting information is updated may be a function extension program (such as an add-on or extension) other than plug-ins or a program pre-installed during manufacture, such as firmware. In short, a program for which setting information is updated may be any program for which setting information is set for each user in relation to a function implemented by the program.

2-14. Updating to Newer Setting Information

In exemplary embodiment, the apparatus ID stored in the storage unit 303 illustrated in FIG. 6 identifies the information processing apparatus 10 that stores the latest setting information for a plug-in among the information processing apparatuses 10 that stores the setting information of the plug-in; however, the apparatus ID stored in the storage unit 303 does not always identify the information processing apparatus 10 that stores the latest setting information. For example, if setting information for a plug-in identified by a plug-in ID associated with a first apparatus ID is updated in a second information processing apparatus among the information processing apparatuses 10 after the first apparatus ID for a first information processing apparatus among the information processing apparatuses 10 is stored in the storage unit 303, the first apparatus ID that identifies the first information processing apparatus 10 storing the setting information that is not the latest one is temporarily stored until a second apparatus ID of the second information processing apparatus is stored in the storage unit 303.

Even in such a case, if a third information processing apparatus among the information processing apparatuses 10 obtains the first or second apparatus ID that identifies the first or second information processing apparatus that stores setting information that is at least newer than setting information stored in the storage unit 120 of the third information processing apparatus, the newer setting information is used in the third information processing apparatus by updating the setting information stored in the third information processing apparatus to the newer setting information obtained from the first or second information processing apparatus.

2-15. Invention Categories

The present invention may be considered as an information processing apparatus, a communication terminal, an information processing system including the information processing apparatus and the communication terminal, an information processing method for implementing a process implemented by the information processing apparatus, and an information processing method for implementing a process implemented by the terminal apparatus. In addition, the present invention may be considered as an information processing program for causing a computer that controls the information processing apparatus or the communication terminal to function as the above-described units. This information program may be provided in a form of a recording medium, such as an optical disc, storing the information processing apparatus, or in a form in which the information processing program is downloaded and installed on a computer via a communication network, such as the Internet so as to be utilizable.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    at least one hardware processor configured to implement:
        a storage unit configured to store first setting information comprising first settings of a function of the information processing apparatus, the first settings being selected by a user at the information processing apparatus;
        a first obtaining unit configured to obtain, from a terminal apparatus, user identification information identifying the user, function identification information identifying the function utilized by the user, and apparatus identification information identifying an apparatus as having been lastly used by the user regarding the function;
        a second obtaining unit configured to obtain, in a case where the apparatus identified by the apparatus identification information is an external apparatus, second setting information comprising second settings of the function from the external apparatus, the second settings being selected by the user at the external apparatus; and
        an updating unit configured to update the first setting information stored in the storage unit with the second setting information obtained by the second obtaining unit.

2. The information processing apparatus according to claim 1, wherein the at least one hardware processor is further configured to implement:
    a notifying unit configured, in a case where the first setting information of the function of the information processing apparatus is updated with the second setting information, to notify the terminal apparatus of the first setting information being updated with the second setting information.

3. The information processing apparatus according to claim 2, wherein the updating unit is further configured, in a case where the first setting information is updated with the second setting information, to update third setting information of the function used by the external apparatus for the function with the second setting information.

4. The information processing apparatus according to claim 1, wherein
    the first obtaining unit is further configured to obtain one or more pieces of function identification information comprising the function identification information, and
    the updating unit is further configured to update the first setting information of the function which the information processing apparatus is configured to perform, the function being among one or more functions identified by the one or more pieces of function identification information obtained by the first obtaining unit.

5. The information processing apparatus according to claim 1, wherein
    the first obtaining unit is further configured to obtain one or more pieces of function identification information comprising the function identification information, and
    the updating unit is further configured to not update setting information of a function which the information processing apparatus does not have, from among one or more functions identified by the one or more pieces of function identification information obtained by the first obtaining unit.

6. The information processing apparatus according to claim 1, wherein the at least one hardware processor is further configured to implement:
    an authentication unit configured to perform user authentication of a user who is to utilize the information processing apparatus, wherein
    the updating unit is further configured to update the first setting information with the second setting information in response to the user being successfully authenticated by the authentication unit.

7. The information processing apparatus according to claim 1, wherein the updating unit is further configured to update the first setting information of the function with the second setting information in response to the user who is to utilize the information processing apparatus performing an operation comprising starting utilization of the function.

8. The information processing apparatus according to claim 1, wherein the at least one hardware processor is further configured to implement:
    a selecting unit configured to select one or more functions to be utilized by the user, wherein
    the updating unit is further configured to update the first setting information of the function with the second setting information, among the one or more functions selected by the selecting unit, in a case where the first setting information used in the information processing apparatus for the function is not a most recent setting information selected by the user.

9. The information processing apparatus according to claim 1, wherein
the first setting information includes a plurality of setting items that change depending on a version of the function, and
the information processing apparatus further comprises:
a first display controller that configured to perform control, in a case where the plurality of setting items include a setting item that is not updated by the updating unit, so as to display a screen configured to set the setting item.

10. The information processing apparatus according to claim 9, wherein each of the plurality of settings of the first setting information is a selected setting of ones of the plurality of setting items selected by the user.

11. The information processing apparatus according to claim 1, wherein the at least one hardware processor is further configured to implement:
a second display controller configured to perform control so as to display information denoting the function identified by the function identification information obtained by the first obtaining unit, the second display controller being further configured to perform control so as to make a display style of the information denoting the function of which the second setting information that is newer than the first setting information stored in the external apparatus is stored in the information processing apparatus and a display style of the information denoting a function other than the function different from each other.

12. The information processing apparatus according to claim 1, wherein the second obtaining unit is further configured to obtain second apparatus identification information from the external apparatus, the second apparatus identification information identifying a second information processing apparatus that stores setting information comprising other settings of the function, the other settings being most recently selected by another user.

13. The information processing apparatus according to claim 1,
wherein the updating unit is further configured to compare the first setting information with the second setting information, and to update the first setting information with the second setting information in response to determining a difference between the first setting information and the second setting information.

14. A terminal apparatus comprising:
at least one hardware processor configured to implement:
a user interface unit configured to be connected to an information processing apparatus and to serve as a user interface when a function of the information processing apparatus is utilized;
a memory configured to store function identification information identifying the function, user identification information identifying a user who has utilized the function, and apparatus identification information identifying an information processing apparatus that stores setting information, among pieces of setting information, comprising a plurality of settings of the function, the plurality of settings being settings of the function most recently selected by the user at the information processing apparatus;
a transmitting unit configured to transmit, to the information processing apparatus, the function identification information, the user identification information, and the apparatus identification information stored in the memory; and
an instructing unit configured to instruct the information processing apparatus to update first setting information stored in the information processing apparatus with the setting information comprising settings most recently selected by the user at an external apparatus,
wherein the memory is further configured to store a second apparatus identification information identifying the external apparatus as having been lastly used by the user regarding the function.

15. The terminal apparatus according to claim 10, wherein the transmitting unit is further configured to transmit, to the information processing apparatus, the function identification information, the user identification information, and the apparatus identification information in response to utilization of the function being started via the user interface unit.

16. A non-transitory computer readable medium storing a program causing a computer to execute a process of information processing, the computer serving as an information processing apparatus that includes a memory, the process comprising:
storing, in the memory, first setting information comprising first settings of a function of the information processing apparatus, the first settings being selected by a user at the information processing apparatus;
obtaining, from a terminal apparatus, user identification information identifying the user, function identification information identifying a function utilized by the user, and apparatus identification information identifying an apparatus as having been lastly used by the user regarding the function;
obtaining, in a case where the apparatus identified by the apparatus identification information is an external apparatus, second setting information comprising second settings of the function from the external apparatus, the second settings being selected by the user at the external apparatus; and
updating the first setting information stored in the memory with the obtained second setting information.

17. A non-transitory computer readable medium storing a program causing a computer to execute a process of information processing, the computer serving as a terminal apparatus including a user interface unit and a memory, the process comprising:
connecting the user interface unit to an information processing apparatus such that the user interface unit serves as a user interface in response to a function of the information processing apparatus being utilized;
storing, in the memory, function identification information identifying the function, user identification information identifying a user who has utilized the function, and apparatus identification information identifying an information processing apparatus that stores setting information, among pieces of setting information, comprising a plurality of settings of the function, the plurality of the settings being settings of the function most recently selected by the user at the information processing apparatus;
transmitting, to the information processing apparatus, the function identification information, the user identification information, and the apparatus identification information stored in the memory;
instructing the information processing apparatus to update first setting information stored in the information processing apparatus with the setting information comprising settings most recently selected by the user at an external apparatus; and storing, in the memory, a second apparatus identification information identifying the external apparatus as having been lastly used by the user regarding the function.

\* \* \* \* \*